United States Patent
Mitsumoto

(10) Patent No.: US 11,436,833 B2
(45) Date of Patent: Sep. 6, 2022

(54) IMAGE PROCESSING METHOD, IMAGE PROCESSING APPARATUS, AND STORAGE MEDIUM THAT DETERMINE A TYPE OF MOVING IMAGE, EXTRACT AND SORT FRAMES, AND DISPLAY AN EXTRACTED FRAME

(71) Applicant: CANON KABUSHIKI KAISHA, Tokyo (JP)

(72) Inventor: Shinichi Mitsumoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 17/060,164

(22) Filed: Oct. 1, 2020

(65) Prior Publication Data

US 2021/0124932 A1    Apr. 29, 2021

(30) Foreign Application Priority Data

Oct. 29, 2019 (JP) .............................. JP2019-196250

(51) Int. Cl.
*G06V 20/40* (2022.01)
*G06F 3/14* (2006.01)

(52) U.S. Cl.
CPC ............... *G06V 20/46* (2022.01); *G06F 3/14* (2013.01); *G06V 20/41* (2022.01)

(58) Field of Classification Search
CPC ........... G06V 20/41; G06V 20/46; G06F 3/14
USPC ....................................................... 382/195
See application file for complete search history.

(56) References Cited

U.S. PATENT DOCUMENTS

| 7,826,667 | B2 * | 11/2010 | Ban ...................... G11B 27/034 |
| | | | 382/222 |
| 8,538,158 | B1 * | 9/2013 | Denise ............... G06K 9/00228 |
| | | | 382/190 |
| 9,911,047 | B2 | 3/2018 | Yamaji |
| 10,074,039 | B2 | 9/2018 | Mitsumoto et al. |
| 10,776,974 | B2 | 9/2020 | Mitsumoto |
| 2013/0088600 | A1 * | 4/2013 | Wu ........................ G08G 1/054 |
| | | | 348/149 |
| 2014/0089816 | A1 * | 3/2014 | DiPersia ............... G06F 3/0484 |
| | | | 715/753 |
| 2019/0122082 | A1 * | 4/2019 | Cuban .............. H04N 21/25883 |
| 2020/0134840 | A1 | 4/2020 | Mitsumoto |

FOREIGN PATENT DOCUMENTS

JP    2016-225679 A    12/2016

* cited by examiner

*Primary Examiner* — Gabriel I Garcia
(74) *Attorney, Agent, or Firm* — Venable LLP

(57) ABSTRACT

An image processing method for extracting a frame from a moving image. The method includes determining a type of the moving image, extracting a frame from the moving image, based on a result of the determination and information indicating a plurality of predetermined types of frame features, the extracted frame having at least one of the plurality of predetermined types of frame features, wherein the plurality of predetermined types of frame features correspond to a plurality of image-capturing scenes, a sorting step of sorting a plurality of frames, which include the frame extracted in the extracting step, into a plurality of frame groups according to the type of the moving image that is determined in the determining step, and displaying the frame extracted in the extracting step on a display device. The plurality of frame groups are displayed on the display device based on the sorting.

20 Claims, 25 Drawing Sheets

| FRAME NUMBER | FRAME TYPE | SCORE |
|---|---|---|
| 300 | KICKING BALL | 0.813 |
| 420 | KICKING BALL | 0.806 |
| 480 | WHALE SPOUTING | 0.848 |
| 570 | EXTINGUISHING CANDLE | 0.834 |
| 630 | CATCHING BALL | 0.827 |
| 720 | WHALE SPOUTING | 0.841 |

FIG.3

| MOVIE IMAGE TYPE | FRAME NUMBER | SCORE |
|---|---|---|
| TYPE A | 300 | 0.813 |
| | 420 | 0.806 |
| | 630 | 0.827 |
| TYPE B | 570 | 0.834 |
| TYPE C | 480 | 0.848 |
| | 720 | 0.841 |

FIG.4

| MOVIE IMAGE TYPE | FRAME TYPE |
|---|---|
| TYPE A | KICKING BALL |
| | CATCHING BALL |
| TYPE B | EXTINGUISHING CANDLE |
| TYPE C | WHALE SPOUTING |

FIG.5

| MOVIE IMAGE TYPE | CLASSIFICATION SCORE |
|---|---|
| TYPE A | 0.831 |
| TYPE B | 0.572 |
| TYPE C | 0.689 |

FIG.12

| MOVIE IMAGE TYPE | FRAME NUMBER | SCORE |
|---|---|---|
| TYPE A | 300 | 0.813 |
| | 420 | 0.806 |
| | 630 | 0.827 |
| TYPE B | 480 | 0.848 |
| | 720 | 0.841 |
| TYPE C | 570 | 0.834 |

FIG.13

| FILE NAME | FRAME NUMBER | FRAME TYPE |
|---|---|---|
| MVI_0002.mp4 | 30 | KICKING BALL |
| MVI_0002.mp4 | 330 | KICKING BALL |
| MVI_0002.mp4 | 750 | CATCHING BALL |
| MVI_0002.mp4 | 960 | KICKING BALL |
| MVI_0004.mp4 | 390 | EXTINGUISHING CANDLE |
| MVI_0004.mp4 | 660 | CRACKER POPPING |
| MVI_0018.mp4 | 1800 | WHALE SPOUTING |
| MVI_0023.mp4 | 930 | WHALE JUMPING |

FIG.15

| FILE NAME | FRAME NUMBER | FRAME FEATURE AMOUNT LIST |
|---|---|---|
| MVI_0001.mp4 | 1 | [0.013, 0.032, 0.012, 0.092, ···] |
| MVI_0001.mp4 | 2 | [0.137, 0.457, 0.314, 0.212, ···] |
| ⋮ | ⋮ | ⋮ |
| MVI_0001.mp4 | 3600 | [0.037, 0.041, 0.056, 0.073, ···] |
| MVI_0005.mp4 | 1 | [0.086, 0.126, 0.097, 0.103, ···] |
| MVI_0005.mp4 | 2 | [0.128, 0.143, 0.141, 0.172, ···] |
| ⋮ | ⋮ | ⋮ |

| FRAME TYPE | FRAME FEATURE AMOUNT LIST |
|---|---|
| KICKING BALL | [0.796, 0.398, 0.289, 0.192, ⋯] |
| KICKING BALL | [0.817, 0.457, 0.314, 0.212, ⋯] |
| CATCHING BALL | [0.832, 0.423, 0.288, 0.242, ⋯] |
| KICKING BALL | [0.781, 0.415, 0.056, 0.073, ⋯] |
| EXTINGUISHING CANDLE | [0.086, 0.126, 0.097, 0.103, ⋯] |
| CRACKER POPPING | [0.128, 0.143, 0.141, 0.172, ⋯] |
| WHALE SPOUTING | [0.632, 0.742, 0.097, 0.103, ⋯] |
| WHALE JUMPING | [0.659, 0.813, 0.141, 0.172, ⋯] |
| ⋮ | ⋮ |

FIG.22B

| FILE NAME | FRAME NUMBER | FRAME TYPE |
|---|---|---|
| MVI_0002.mp4 | 30 | KICKING BALL |
| MVI_0002.mp4 | 360 | KICKING BALL |
| MVI_0002.mp4 | 720 | CATCHING BALL |
| MVI_0002.mp4 | 810 | WHALE JUMPING |
| MVI_0002.mp4 | 960 | KICKING BALL |
| MVI_0004.mp4 | 1140 | CATCHING BALL |
| MVI_0004.mp4 | 390 | EXTINGUISHING CANDLE |
| ⋮ | ⋮ | ⋮ |

FIG.23A

| FILE NAME | KICKING BALL | CATCHING BALL | EXTINGUISHING CANDLE | CRACKER POPPING | WHALE SPOUTING | WHALE JUMPING |
|---|---|---|---|---|---|---|
| MVI_0002.mp4 | 0.6 | 0.333 | 0.0 | 0.0 | 0.0 | 0.116 |
| MVI_0004.mp4 | 0.0 | 0.0 | 0.5 | 0.361 | 0.135 | 0.0 |
| MVI_0018.mp4 | 0.112 | 0.134 | 0.0 | 0.078 | 0.423 | 0.253 |
| ... | ... | ... | ... | ... | ... | ... |

| MOVIE IMAGE TYPE | MOVIE IMAGE FILE LIST |
|---|---|
| TYPE A | MVI_0002.mp4, MVI_0008.mp4, ... |
| TYPE B | MVI_0004.mp4, MVI_0010.mp4, ... |
| TYPE C | MVI_0018.mp4, MVI_0023.mp4, ... |
| ... | ... |

2302

IMAGE PROCESSING METHOD, IMAGE PROCESSING APPARATUS, AND STORAGE MEDIUM THAT DETERMINE A TYPE OF MOVING IMAGE, EXTRACT AND SORT FRAMES, AND DISPLAY AN EXTRACTED FRAME

CROSS-REFERENCE TO RELATED APPLICATIONS

This application claims the benefit of Japanese Patent Application No. 2019-196250, filed Oct. 29, 2019, which is hereby incorporated by reference herein in its entirety.

BACKGROUND OF THE INVENTION

Field of the Invention

The present invention relates to an image processing method, an image processing apparatus, and a storage medium for extracting a frame from a movie image.

Description of the Related Art

In recent years, with the spread of digital cameras and smartphones, it has become possible to easily capture movie images. Not only simply viewing the captured movie images, it is also possible to extract a specific frame from the movie images as a still image and to use the still image for a photobook or a slide show. Note that a large number of frames are included in a movie image, and, in a case when a user searches for and selects a frame at a specific moment, such as a significant moment out of the large number of frames, such work will be a heavy burden on the user.

Therefore, as a technique for selecting a specific moment from a movie image, a technique has been proposed in which frames are analyzed and a frame having a high evaluation value is extracted so that the user can select the frame. However, in such a technique, even a frame having a high evaluation value does not always correspond to a specific moment. For example, in a movie image of capturing one scene of sports or the like, in a case when one frame in the scene obtains a high evaluation value as a scene of extinguishing a candle, which is not related to sports, this frame is extracted and a scene desired by the user is not extracted.

As a technique for solving such a problem, the technique disclosed in Japanese Patent Laid-Open No. 2016-225679 has been proposed. That is, in the technique disclosed in Japanese Patent Laid-Open No. 2016-225679, the user can easily and accurately select a frame of a specific moment by use of information in a still image captured at the same time as the movie image from which frames are extracted.

However, with the technique disclosed in Japanese Patent Laid-Open No. 2016-225679, it is not possible to easily and accurately to select a frame of a specific moment with a movie image alone.

SUMMARY OF THE INVENTION

The present invention has been made in view of the above problem, and the present invention provides a technique capable of easily and accurately selecting a frame of a specific moment from a movie image.

In a first aspect, the present invention provides an image processing method for extracting a frame from a moving image. The image processing method includes a determining step of determining a type of the moving image, an extracting step of extracting a frame from the moving image, based on a result of determination in the determining step and information indicating a plurality of predetermined types of frame features, the extracted frame having at least one of the plurality of predetermined types of frame features, wherein the plurality of predetermined types of frame features correspond to a plurality of image-capturing scenes, and a display control step of displaying the frame extracted in the extracting step on a display device.

In a second aspect, the present invention provides an image processing apparatus for extracting a frame from a moving image. The image processing apparatus includes a determining unit configured to determine a type of the moving image, an extracting unit configured to extract a frame from the moving image, based on a result of determination by the determining unit and information indicating a plurality of predetermined types of frame features, the extracted frame having at least one of the plurality of predetermined types of frame features, wherein the plurality of predetermined types of frame features correspond to a plurality of image-capturing scenes, and a display control unit configured to display the frame extracted by the extracting unit on a display device.

In a third aspect, the present invention provides a non-transitory computer readable storage medium storing a program for causing a computer to perform an image processing method for extracting a frame from a moving image. The image processing method includes a determining step of determining a type of the moving image, an extracting step of extracting a frame from the moving image, based on a result of determination in the determining step and information indicating a plurality of predetermined types of frame features, the extracted frame having at least one of the plurality of predetermined types of frame features, wherein the plurality of predetermined types of frame features correspond to a plurality of image-capturing scenes, and a display control step of displaying the frame extracted in the extracting step on a display device.

According to the present invention, a frame of a specific moment can be easily and accurately selected from a movie image.

Further features of the present invention will become apparent from the following description of exemplary embodiments with reference to the attached drawings.

BRIEF DESCRIPTION OF THE DRAWINGS

FIG. 3 is a diagram illustrating an example of an analyzed frame table;

FIG. 4 is a diagram illustrating an example of a candidate frame table;

FIG. 5 is a diagram illustrating an example of a type-correspondence rule table;

FIG. 12 is a flowchart illustrating an example of a movie image type score table;

FIG. 13 is a diagram illustrating an example of a candidate frame table;

FIG. 15 is a diagram illustrating an example of a correct data table;

FIG. 16 is a diagram illustrating an example of a frame feature table;

FIG. 21 is a diagram showing a relation between FIGS. 21A and 21B;

FIGS. 22A and 22B are diagrams illustrating examples of a learning feature amount list and a management table;

FIGS. 23A and 23B are diagrams illustrating examples of a distribution table and a movie image type classification table.

DESCRIPTION OF THE EMBODIMENTS

Hereafter, with reference to the accompanying drawings, a detailed explanation is given of examples of an embodiment of an image processing method, an image processing apparatus, and a storage medium. Note that it is not intended that the following embodiments limit the present invention, and every combination of the characteristics explained in the present embodiments is not necessarily essential to the solution in the present invention. In addition, relative positions, shapes, and the like, of the constituent elements described in the embodiments are merely examples and are not intended to limit the present invention to the range of the examples.

First Embodiment

First, with reference to FIG. 1 through FIG. 9, a detailed explanation is given of the image processing apparatus according to the first embodiment.
<Hardware Configuration>

Figure 1:
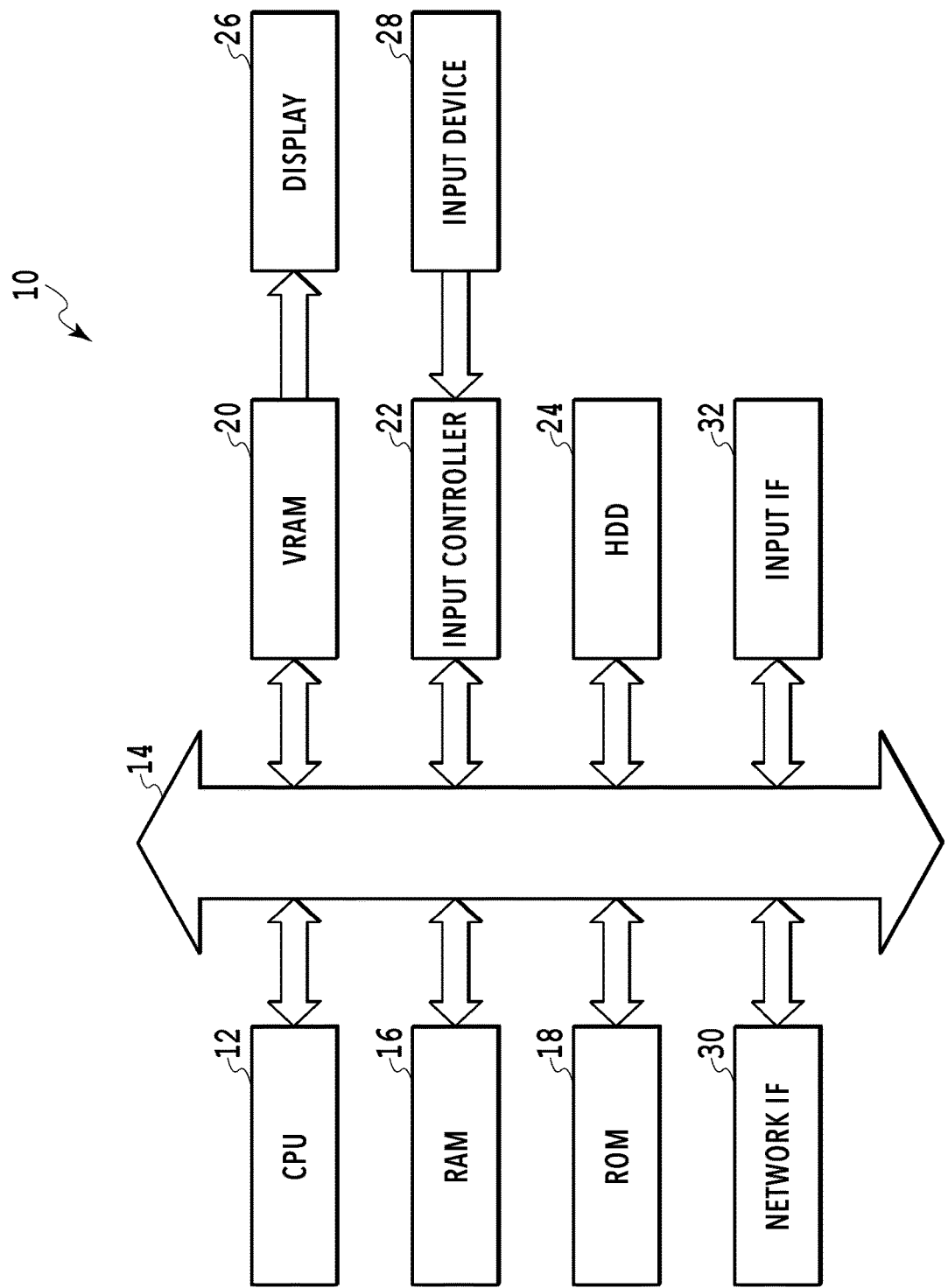
FIG. 1 is a block diagram illustrating a hardware configuration of an image processing apparatus according to an embodiment.

FIG. 1 is a block diagram illustrating a hardware configuration of a photobook creation apparatus, which is the image processing apparatus according to the first embodiment. The photobook creation apparatus 10 according to the first embodiment includes a central processing unit (CPU) 12, which controls a computer system. In the photobook creation apparatus 10, the CPU 12 calculates and processes information and controls each hardware, based on control programs, so as to implement each of the later-described functional configurations and processes.

In the photobook creation apparatus 10, the CPU 12 is connected to a random access memory (RAM) 16 and a read only memory (ROM) 18 via a bus 14. The RAM 16 functions as a main memory of the CPU 12 and as a work memory required for loading a program to be executed and for executing a program. Furthermore, the ROM 18 is a storage area that stores a control program defining a procedure of an operation to be processed by the CPU 12. The ROM 18 includes a program ROM, in which basic software (OS: Operating System) that is a system program for controlling a computer system is recorded, and a data ROM, in which information required for operating a system, etc., is recorded.

The CPU 12 is also connected to a video RAM (VRAM) 20, an input controller 22, and a hard disk drive (HDD) 24 via the bus 14. The VRAM 20 loads an image to be displayed on the screen of the display 26, which is a display device. The display 26 is a display device, such as a liquid crystal display or a liquid crystal TV. The input controller 22 is a controller that controls input signals from an input device 28. The input device 28 is an external input device for receiving an operation instruction from the user, and the input device 28 is connected to the input controller 22. As the input device 28, for example, a touch panel, a keyboard, a mouse, a remote controller, or the like, can be used. The HDD 24 is a storage device, which is used for saving data such as application programs and image data.

Furthermore, the CPU 12 is connected to a network interface (network IF) 30 and an input interface (input IF) 32 via the bus 14. The network IF 30 controls input and output of data such as image data transmitted and received via a network (not illustrated in the drawings). The input IF 32 is an interface to be connected to an external device such as a CD (DVD)-ROM drive and a memory card drive, and, for example, the input IF 32 is used for reading image data that is captured by a digital camera. Furthermore, the bus 14 is an input/output bus (address bus, data bus, control bus, etc.) for connecting the above-mentioned configurations.
<Functional Configuration>

Figure 2:
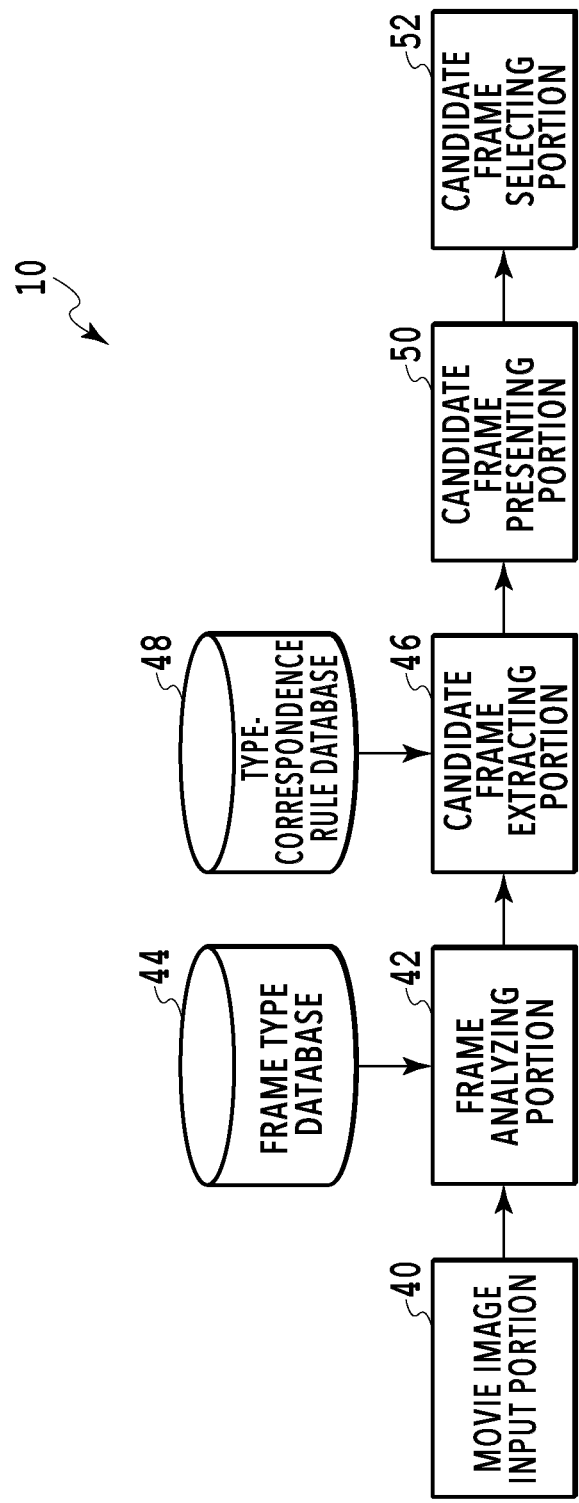
FIG. 2 is a block diagram illustrating a functional configuration of the image processing apparatus according to the first embodiment.

Next, an explanation is given of a functional configuration of the photobook creation apparatus 10. FIG. 2 is a diagram illustrating a functional configuration of the photobook creation apparatus. Note that, regarding the photobook creation apparatus 10, an explanation is given of a case of creating a photobook by use of frames extracted from a movie image. The image processing apparatus according to the present embodiment is not limited to the photobook creation apparatus 10, and the image processing apparatus may be configured to create another product such as a calendar based on frames or may be configured to print a frame on a single sheet.

The photobook creation apparatus 10 includes a movie image input portion 40, which inputs a movie image file (hereafter simply referred to as a "movie image" or "moving image" as appropriate) via the input IF 32 and extracts a frame from the input movie image. Further, the photobook creation apparatus 10 includes a frame analyzing portion 42, which analyzes a frame extracted by the movie image input portion 40, and a frame type database 44, which stores information to be used for analysis by the frame analyzing portion 42. Moreover, the photobook creation apparatus 10 includes a candidate frame extracting portion 46, which extracts a candidate frame as a candidate for a significant moment, and a type-correspondence rule database 48, which stores information to be used for extraction of candidate frames that is performed by the candidate frame extracting portion 46. Furthermore, the photobook creation apparatus 10 includes a candidate frame presenting portion 50, which displays a candidate frame on the display 26 as presentation to the user, and a candidate frame selecting portion 52, which outputs a presented candidate frame to a layout portion (not illustrated in the drawings), based on selection by the user. Note that the layout portion lays out the frames that are output from the candidate frame presenting portion 50 to create a photobook.

More specifically, a movie image is input to the movie image input portion 40 from the input IF 32. Then, the image of each frame (hereinafter simply referred to as a "frame") included in the input movie image is extracted. Frame numbers are assigned to the extracted frames in the order of extraction, for example. The extracted frames are stored in the HDD 24, for example. Note that, a movie image to be input in the present embodiment is, for example, a movie image in which a scene such as sports, a birthday party, or whale watching is captured.

The frame analyzing portion 42 analyzes a frame extracted by the movie image input portion 40, so as to obtain identification information of each frame and to calculate a feature amount of each frame. Note that, for example, the identification information of a frame is a frame number, a movie image file name, or the like. The feature amount of a frame is, for example, a frame's color information, luminance information, information related to the time of image-capturing and a focal length obtained at the time of image-capturing, or the like. Furthermore, by use of a calculated feature amount and a learning parameter stored in the frame type database 44, each frame is classified into a frame type that is set in advance, and a score indicating the certainty of the frame type is calculated. Publicly-known techniques can be used for the method for classifying frame types, and, for example, a machine learning method such as a support vector machine is used. Furthermore, publicly-known techniques can be used for the method for calculating scores, and thus the explanation thereof will be omitted. A frame type (frame feature) corresponds to, for example, a characteristic situation of each scene (each of captured scenes).

In the present embodiment, the frame analyzing portion 42 functions as an obtaining portion that obtains, for each frame, identification information and a frame type, which corresponds to a feature amount (information indicating a frame feature) and into which the frame is classified. Then, the frame analyzing portion 42 creates an analyzed frame table 300 (see FIG. 3) in which the information of analyzed frames, that is, the scores and frame types obtained by use of a machine learning method are registered. Note that, in the analyzed frame table 300, only the frames whose score is equal to or higher than a predetermined value, which is set in advance, are to be registered.

FIG. 3 is a diagram illustrating an example of the analyzed frame table. In the analyzed frame table 300, which is created for an input movie image, a score and frame type obtained by analysis performed by the frame analyzing portion 42 are associated with the frame number of each frame. The frame number is a serial number of each of the extracted frames. The frame type may be, for example, "KICKING BALL" which indicates a situation of kicking a ball, "CATCHING BALL" which indicates a situation of catching a ball, etc. Furthermore, for example, the frame type may be "WHALE SPOUTING" which indicates a situation where a whale spouts, "EXTINGUISHING CANDLE" which indicates a situation where a candle on a cake is extinguished, etc. The scores represent certainty of the frame types and the values thereof are represented between 0 and 1.0. The higher the score is, the higher the likelihood of the frame type is, that is, it is indicated that the degree of the certainty of the frame type is high. Therefore, in the analyzed frame table 300, the frames whose score is equal to or higher than a predetermined value, that is, the frames whose certainty of the frame type is equal to or higher than a fixed evaluation value are to be registered.

In this way, the frame types having a score equal to or higher than a predetermined value, which are registered in the analyzed frame table 300 by the frame analyzing portion 42, can correspond to frames of significant moments in the input movie image, respectively. However, in a case of only using the information registered in the analyzed frame table 300, the frame types are mixed in time series, and there is a possibility that a frame type that is poorly related to the scene captured in the input movie image is extracted. That is, a frame that is poorly related to the scene captured in the input movie image but has a high score of an evaluation value is extracted. Therefore, in the present embodiment, a process of sorting frames of frame types whose score is equal to or higher than a predetermined score value into the respective movie image types that represent the types of the scene, so that the user can more appropriately select a frame that is highly related to the scene of the movie image.

The frame type database 44 stores information for the frame analyzing portion 42 to classify frames into preset frame types. Specifically, learning parameters for classifying frames into the frame types that are preset by a machine learning method are stored.

The candidate frame extracting portion 46 sorts information of the frames registered in the analyzed frame table 300 into the respective movie image types, based on the later-described type-correspondence rule table 500. Then, the candidate frame table 400 having identification information of candidate frames, which are sorted according to the movie image types and are to be candidates for significant moments, is created. FIG. 4 is a diagram illustrating an example of the candidate frame table 400. The candidate frame table 400 is created for each movie image that is input. In the candidate frame table 400, frame numbers and scores thereof that are registered in the analyzed frame table 300 are associated with movie image types. In the present embodiment, the candidate frame extracting portion 46 functions as a sorting portion that sorts frame types into preset movie image types, respectively.

Further, the type-correspondence rule database 48 stores the type-correspondence rule table 500 in which a frame type is associated with each movie image type. The stored type-correspondence rule table 500 is used in a case when the candidate frame extracting portion 46 creates the candidate frame table 400. FIG. 5 is a diagram illustrating an example of the type-correspondence rule table 500. The type-correspondence rule table 500 is a table that manages rules of correspondence between a movie image type and a frame type. The movie image type represents the type of the movie image (scene), which corresponds to the frame type, and is defined so as to be capable of including multiple frame types. Note that, since the movie image type is not information to be exposed to the outside, the movie image type only has to be internally identifiable, such as TYPE A and TYPE B.

For example, it is assumed that TYPE A of the movie image type corresponds to sports such as soccer, and the corresponding frame types may be a situation of kicking a ball, such as making a shot, and a situation of catching a ball. It is assumed that TYPE B corresponds to, for example, a party such as a birthday party, and the corresponding frame types may be a situation of extinguishing a candle and a situation of popping a cracker. It is assumed that TYPE C corresponds to, for example, whale watching, or the like, and the corresponding frame types may be a situation where a whale spouts and a situation where a whale jumps from the sea surface. Note that the assumed contents for each movie image type and the corresponding frame types thereof are merely examples and are not limited to the above.

Figure 6:
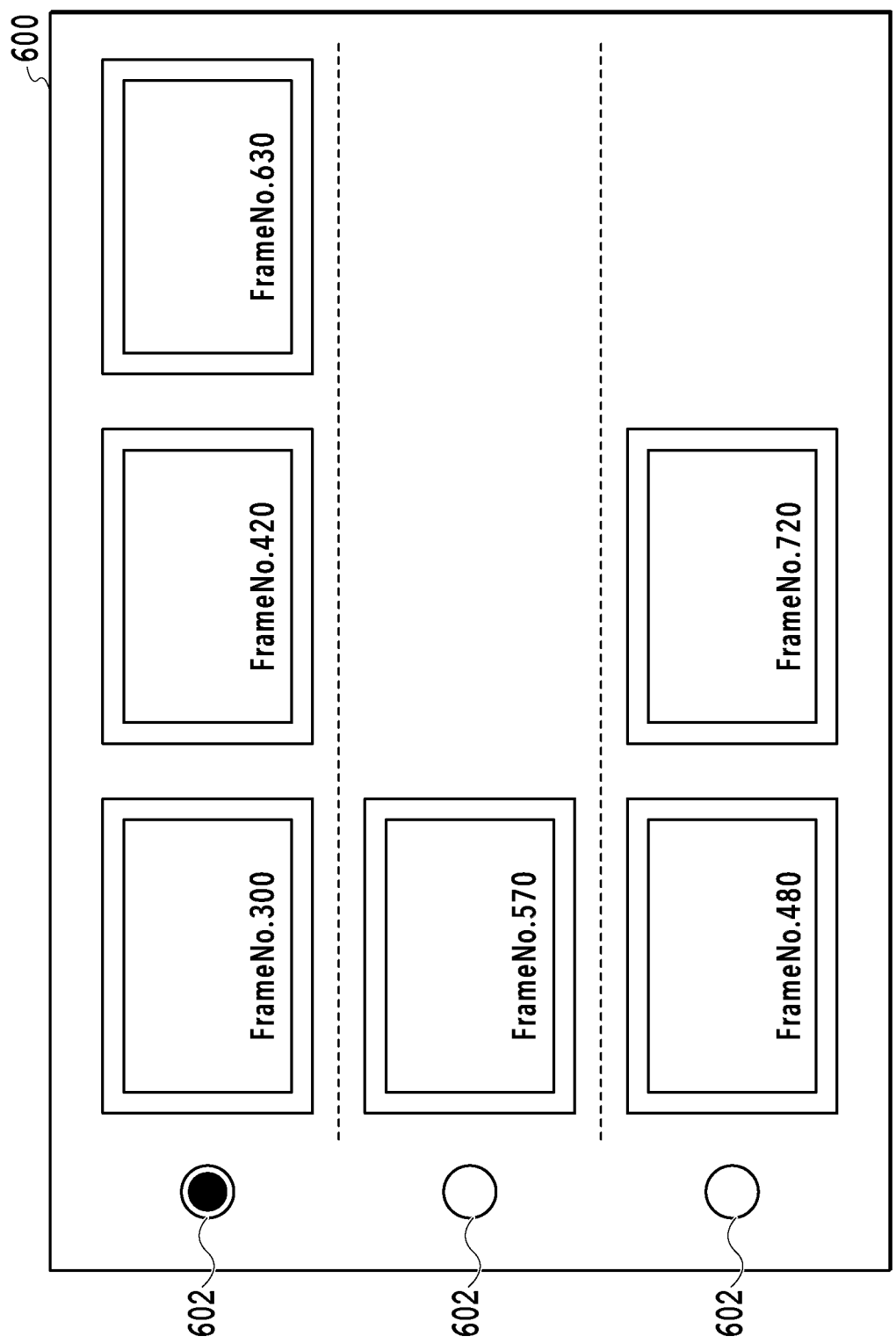
FIG. 6 is a diagram illustrating an example of a display form on a selection screen.

The candidate frame presenting portion 50 displays frames on the display 26 in a selectable manner, based on the candidate frame table 400 created by the candidate frame extracting portion 46. FIG. 6 is a diagram illustrating a selection screen 600 for the candidate frame presenting portion 50 to display frames on the display 26 in a selectable manner. On the selection screen 600, the frames corresponding to the frame numbers of the candidate frame table 400 are divided into the respective movie image types and displayed. For example, the frames with frame numbers 300, 420, and 630 that are associated with TYPE A in the candidate frame table 400 illustrated in FIG. 4 are displayed in the upper row of the selection screen 600. Furthermore, the frame with frame number 570 that is associated with TYPE B is displayed in the middle row of the selection screen 600. Moreover, the frames with frame numbers 480 and 720 that are associated with TYPE C are displayed in the lower row of the selection screen 600. In addition, on the selection screen 600, there is a radio button 602 in a display region in which frames of each movie image type are displayed, so that a frame can be selected for each movie image type.

In the present embodiment, the candidate frame presenting portion 50 functions as a presenting portion that presents a frame for each movie image type, based on identification information (frame numbers) of the frames of frame types, which are sorted into each movie image type. Note that, although the frame numbers are displayed in the frames in FIG. 6, such a display is not necessary. Furthermore, it is also possible that the radio button 602 is not provided. Moreover, as for the frames displayed on the selection screen 600, it is also possible that multiple frames can be selected by selecting a radio button 602 or directly selecting each frame. In addition, it is also possible that the presented frames are thumbnailed image data. In this way, by sorting frames based on movie image types, the user can select frames in such a state where the frames are arranged on a per movie image type basis, so that it is possible to select a more desirable frame while comparing each frame.

The candidate frame selecting portion 52 obtains the information selected by the user on the selection screen 600 via the input device 28 and outputs the obtained information to the layout portion (not illustrated in the drawings). Specifically, in a case when a specific frame is selected, the selected frame is output to the layout portion. Furthermore, in a case when a radio button 602 is selected, the frames displayed in the display region corresponding to the selected radio button are output to the layout portion. In the present embodiment, the input device 28 and the candidate frame selecting portion 52 function as a selecting portion that selects a frame displayed on the selection screen 600.

<Photobook Creation Processing>

With the above-described configurations, an explanation is given of photobook creation processing for creating a photobook by use of the photobook creation apparatus 10.

Figure 7:
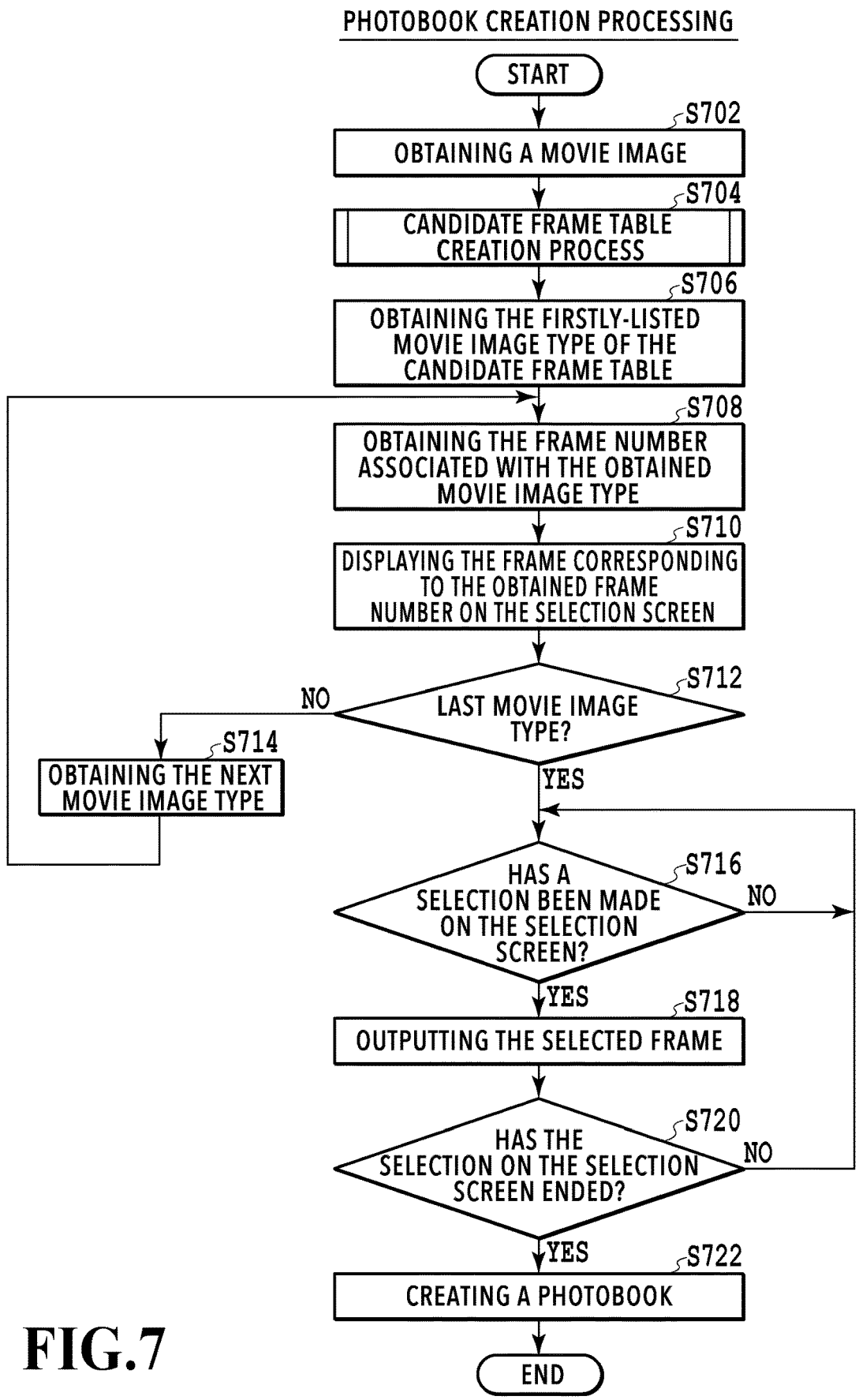
FIG. 7 is a flowchart of photobook creation processing performed by the image processing apparatus according to the first embodiment.

Upon an instruction for creating a photobook, the photobook creation apparatus 10 starts the photobook creation processing. FIG. 7 is a flowchart illustrating a detailed processing routine of the photobook creation processing. The series of processes illustrated in the flowchart of FIG. 7 is performed by the CPU 12 loading a program code stored in the ROM 18 into the RAM 16 and executing the program code. Alternatively, a part or all of the functions in the steps of FIG. 7 may be implemented by hardware such as an ASIC or an electronic circuit. Note that the symbol "S" in the explanation of each process means that it is a step in the flowchart (the same applies hereafter in the present specification). In the photobook creation processing, first, the movie image input portion 40 obtains a movie image to be a target of the photobook creation (S702). Then, based on the obtained movie image, a candidate frame table creation process for creating a candidate frame table 400, in which information about frames to be candidates for significant moments is registered, is executed (S704).

Figure 8:
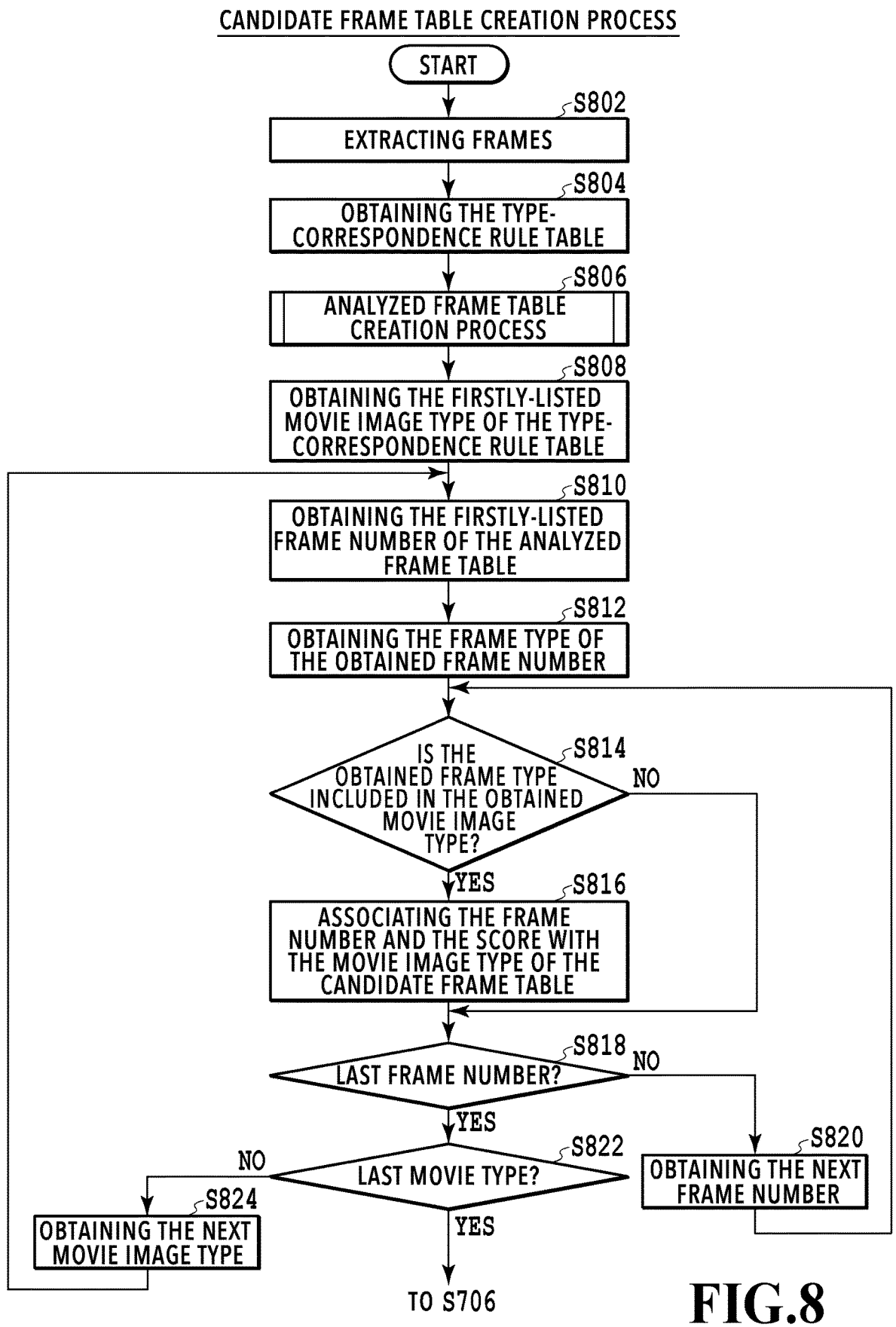
FIG. 8 is a flowchart of a candidate frame table creation process performed by the image processing apparatus according to the first embodiment.

FIG. 8 is a flowchart illustrating a detailed processing routine of the candidate frame table creation process. In the candidate frame table creation process of S704, first, the movie image input portion 40 extracts frames from the obtained movie image (S802). Each of the extracted frames is assigned with a frame number and stored in the HDD 24. Note that it is also possible that the frames are stored in the RAM 16. In S802, it is also possible that all the frames included in the obtained movie image are extracted or that frames are extracted after thinning out frames at predetermined time intervals. In a case of extracting frames after thinning out frames, it is also possible to only extract I pictures, which are intra frames, if the movie image compression format has a GOP (Group Of Pictures) structure.

Next, the candidate frame extracting portion 46 obtains the type-correspondence rule table 500 from the type-correspondence rule database 48 (S804). Then, the frame analyzing portion 42 performs an analyzed frame table creation process, in which the extracted frames are analyzed so as to create an analyzed frame table 300 (S806).

Figure 9:
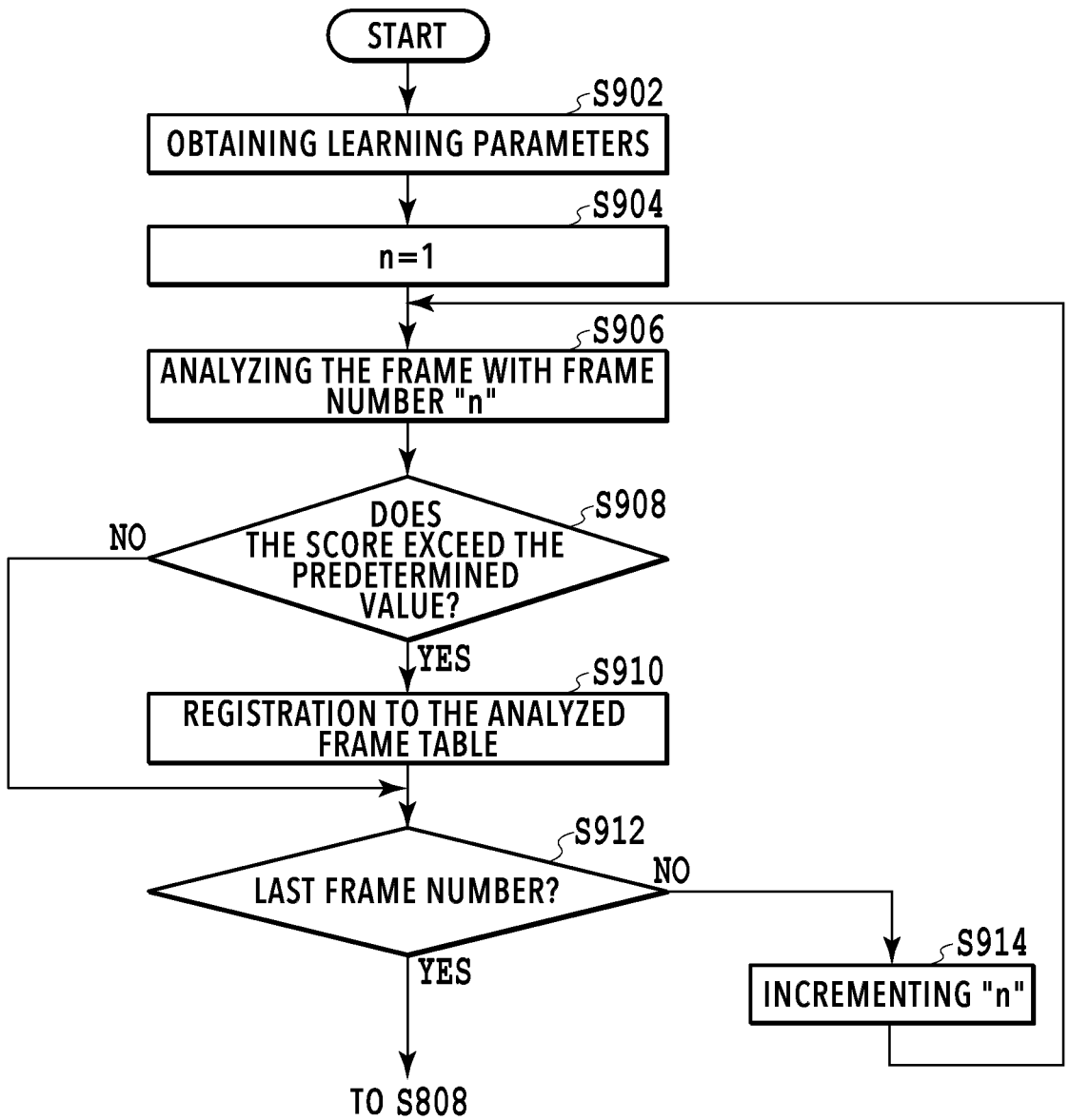
FIG. 9 is a flowchart of an analyzed frame table creation process.

FIG. 9 is a flowchart illustrating a detailed processing routine of the analyzed frame table creation process. In the analyzed frame table creation process of S806, first, the frame analyzing portion 42 obtains learning parameters from the frame type database 44 (S902). Next, the frame analyzing portion 42 sets variable "n", which represents the processing-target frame number, to "1" (S904) and analyzes the frame with frame number "n" (S906).

That is, in S906, a feature amount of the frame is calculated, so that a frame type classification process is performed by use of a machine learning method, based on the calculated feature amount and the learning parameters obtained in S902. Additionally, a score indicating the certainty of the frame type is calculated. Publicly-known techniques can be applied to the frame type classification process. For example, a support vector machine, which is used in general object detection techniques, can be applied.

As an example of classification into a preset frame type by use of a general object detection technique, in a case of detecting an area of an object included in a frame type to be output, the frame is classified into that frame type. Specifically, in a case when an area in which "a person is kicking a ball" is detected, the frame type becomes "KICKING BALL". Further, in a case when an area in which "whale is spouting" is detected, the frame type becomes "WHALE SPOUTING". Note that, in a case when multiple areas are detected in one frame, the area whose score indicating the certainty of the detected area is the highest will be adopted, and the type corresponding to the area will be set as the frame type. Note that, in this case, not only how high the scores are, but also the sizes of the detected areas can be used to determine the area to be adopted. Further, it is also possible to convert the sizes of the areas into scores or to combine scores indicating certainty of the frame types and the sizes of the areas in order to calculate new scores.

Moreover, as for scores, in addition to certainty of frame types, image quality evaluation values obtained by evaluating the image qualities in a publicly-known method may be added. For example, such an image quality evaluation value that deducts a score in a case when the face region of a subject is blurred can be set. As a result, it is possible to reduce the possibility that an image with poor image quality will be registered in the candidate frame table even though the score of the certainty of the frame type thereof is high.

Thereafter, whether or not the score value obtained by the analysis exceeds a predetermined value is determined (S908). The predetermined value is set in advance and may be configured such that the user is able to change the setting, for example. In a case when it is determined in S908 that the score value is equal to or lower than the predetermined value, the processing proceeds to S912, which is described later. Further, in a case when it is determined in S908 that the score value exceeds the predetermined value, the frame number, the frame type, and the score of the analyzed frame are registered in the analyzed frame table 300 (S910).

Then, the processing proceeds to S912, so that whether or not frame number "n" of the analyzed frame is the last frame number is determined. In a case when it is determined that frame number "n" of the analyzed frame is not the last frame number, variable "n" is incremented (S914) and the processing returns to S906. Further, in a case when it is determined that the frame number of the analyzed frame is the last frame number, the processing proceeds to S808. Note that, in a case when all the frames in the movie image are extracted in S802, it is also possible to execute the analysis of frames in S906 by thinning out frames. That is, in this case, variable "I" ("I" is a natural number), which is in consideration of thinning, is to be added in S914, instead of variable "n".

Returning to FIG. 8, the explanation is continued. In S806, upon creation of the analyzed frame table 300, the created analyzed frame table 300 is output to the candidate frame extracting portion 46. Next, the processing proceeds to S808, so that the candidate frame extracting portion 46 obtains the firstly-listed movie image type on the type-correspondence rule table 500. That is, in a case of the type-correspondence rule table 500 of FIG. 5, "TYPE A" is obtained. In S808, the obtained firstly-listed movie image type is set as the processing-target movie image type MT to be processed thereafter.

Next, the candidate frame extracting portion 46 obtains the firstly-listed frame number on the analyzed frame table 300 (S810). That is, in a case of the analyzed frame table 300 of FIG. 3, frame number "300" is obtained. In S810, the obtained firstly-listed frame number is set as the processing-target frame number FN to be processed thereafter. Then, the candidate frame extracting portion 46 obtains the frame type of frame number FN (S812) and determines whether or not the obtained frame type is included in the movie image type MT of the type-correspondence rule table 500 (S814).

In a case when it is determined in S814 that the obtained frame type is not included in movie image type MT, the processing proceeds to S818, which is described later. Further, in a case when it is determined in S814 that the obtained frame type is included in movie image type MT, the frame number and the score thereof are registered in association with movie image type MT of the candidate frame table 400 (S816). In a case when there is not movie image type MT in the candidate frame table 400, a field of movie image type MT will be added.

Thereafter, the processing proceeds to S818, so that the candidate frame extracting portion 46 determines whether or not frame number FN is the last frame number of the analyzed frame table 300. In a case when it is determined in S818 that frame number FN is not the last frame number, the next frame number of the analyzed frame table 300 is obtained (S820), and the processing returns to S812. In S820, the obtained next frame number is set as frame number FN. Further, in a case when it is determined in S818 that the frame number FN is the last frame number, the candidate frame extracting portion 46 determines whether or not movie image type MT is the last movie image type of the type-correspondence rule table 500 (S822).

In a case when it is determined in S822 that movie image type MT is not the last movie image type, the next movie image type of the type-correspondence rule table 500 is obtained (S824), and the processing returns to S810. Further, in a case when it is determined in S822 that movie image type MT is the last movie image type, the processing proceeds to S706, which is described later.

Returning to FIG. 7, the explanation is continued. In S704, upon creation of the candidate frame table 400, the candidate frame table 400 is output to the candidate frame presenting portion 50. Thereafter, the candidate frame presenting portion 50 obtains the firstly-listed movie image type of the candidate frame table 400 (S706). That is, in a case of the candidate frame table 400 of FIG. 4, "TYPE A" is obtained. In S706, the obtained firstly-listed movie image type is set as processing-target movie image type mt to be processed thereafter.

Next, the candidate frame presenting portion 50 obtains the frame number associated with movie image type mt (S708). Then, the candidate frame presenting portion 50 obtains the frame corresponding to the obtained frame number from the HDD 24 and displays the frame on the selection screen 600 (S710). That is, in S710, in a case when movie image type mt is the firstly-listed movie image type of the candidate frame table 400, movie image type mt will be displayed in the firstly-listed display region of the selection screen 600. Further, in a case when movie image type mt is not the firstly-listed movie image type of the candidate frame table 400, the movie image type will be displayed in the display region next to the last display region in which a frame is displayed at that point in time.

Thereafter, the candidate frame presenting portion 50 determines whether or not movie image type mt is the last movie image type of the candidate frame table 400 (S712). In a case when it is determined in S712 that movie image type mt is not the last movie image type, the next movie image type of the candidate frame table 400 is obtained (S714), and the processing returns to S708. Further, in a case when it is determined in S712 that movie image type mt is the last movie image type, the candidate frame selecting portion 52 determines whether or not a selection has been made on the selection screen 600 (S716).

In a case when it is determined in S716 that a selection has been made on the selection screen 600, the candidate frame selecting portion 52 outputs the selected frame to the layout portion (not illustrated in the drawings), based on the selected contents (S718). That is, in S718, in a case when a frame is selected, the selected frame is output to the layout portion. Further, in a case when a radio button 602 is selected, all the frames displayed in the display region corresponding to the position of the selected radio button 602 are output to the layout portion.

Next, the candidate frame selecting portion 52 determines whether or not the selection on the selection screen 600 has ended (S720). For example, a button (not illustrated in the drawings) for ending the selection is displayed on the selection screen 600, and, in S720, in a case when this button is selected, it is determined that the selection on the selection screen 600 has ended. In a case when it is determined in S720 that the selection has not ended, the processing returns to S716. Further, in a case when it is determined in S720 that the selection has ended, the layout portion creates a photobook by use of the input frames (S722), and the present photobook creation processing ends.

As explained above, the photobook creation apparatus 10, which is the image processing apparatus according to the present embodiment, classifies frames that are candidates for significant moments, which are extracted from a movie image, into preset frame types. Then, by use of the type-correspondence rule table 500, frames whose score representing the certainty of the frame type exceeds a predetermined value are sorted into the respective movie image types. Thereafter, on the selection screen 600, frames are displayed on a per sorted movie image type basis.

Accordingly, it is possible for the user to refer to the frames displayed on a per movie image type basis on the selection screen 600 and to easily and accurately to select a desired frame. That is, compared to a case in which frames are simply displayed in an order of image-capturing times or high scores, the frames are arranged on a per movie image type basis. Therefore, it is possible for the user to easily recognize desired frames that match movie image contents and to prevent frames that do not match the movie image contents from being selected.

Second Embodiment

Next, with reference to FIG. 10 through FIG. 13, an explanation is given of the image processing apparatus according to the second embodiment. Note that, in the following explanation, the same or corresponding configurations as those of the first embodiment described above are assigned with the same signs as those used in the first embodiment, so as to omit detailed explanations thereof.

Compared to the image processing apparatus of the first embodiment described above, the second embodiment is different in the aspect that a classification score that indicates the certainty of a movie image type is obtained so that frames are displayed on the selection screen 600 on a per movie image type basis according to the priority based on the obtained classification score. That is, in the present embodiment, by determining the priority for displaying each movie image type on the selection screen 600 by use of the classification scores of the movie image types obtained by classification based on the input movie image, frames that are more likely to be the movie image type are displayed in an upper row of the selection screen 600. For example, in a case when movie image M1 is input and the classification score of movie image type β is higher than the classification score of movie image type α, frames of movie image type β are displayed in the upper row of the selection screen 600. Therefore, in the present embodiment, it is possible for the user to more easily and accurately select a desired frame.
<Functional Configuration>

Figure 10:
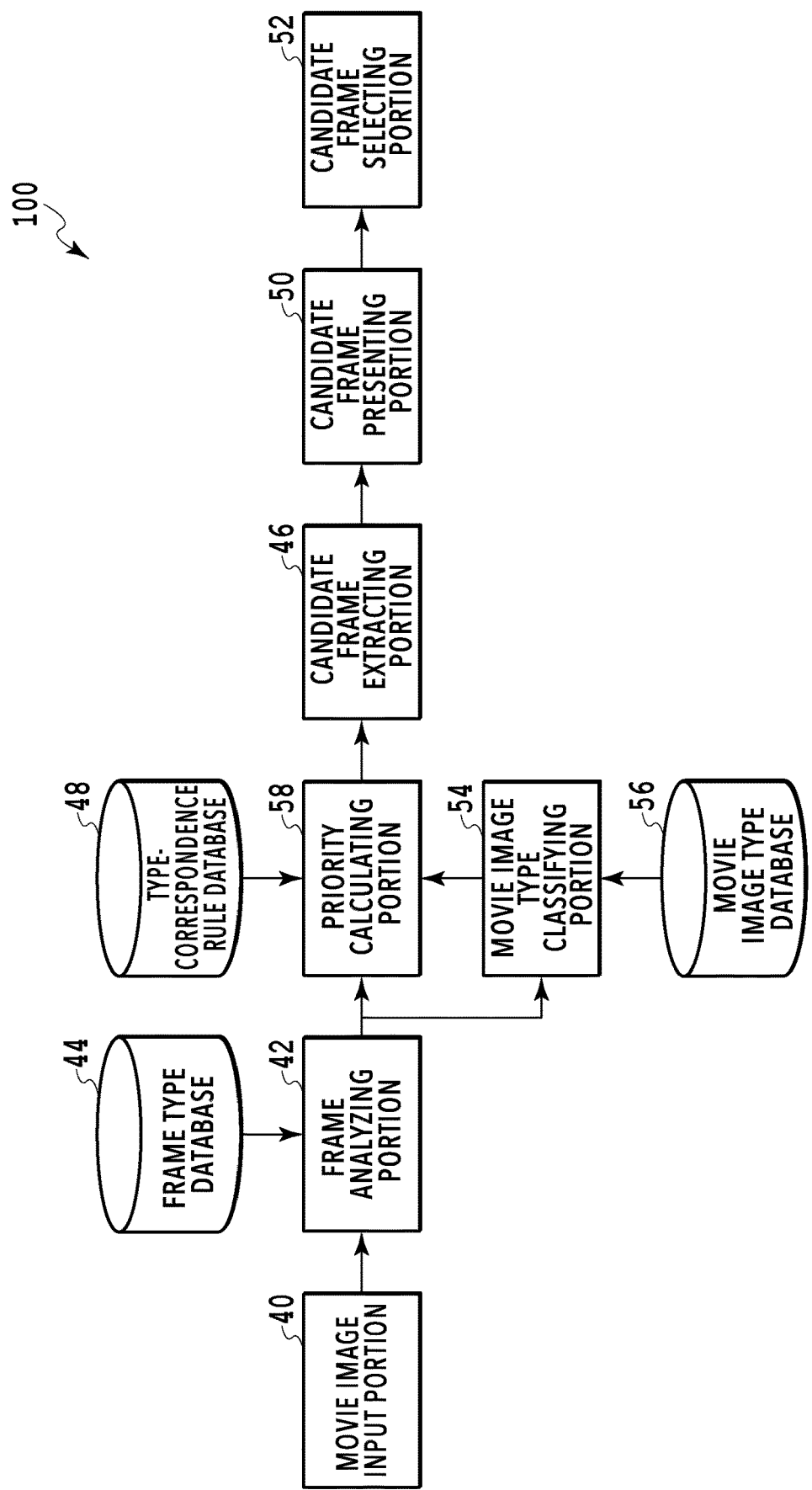
FIG. 10 is a block diagram illustrating a functional configuration of the image processing apparatus according to the second embodiment.

FIG. 10 is a diagram illustrating a functional configuration of a photobook creation apparatus 100, which is the image processing apparatus according to the second embodiment. In addition to the respective components of the photobook creation apparatus 10, the photobook creation apparatus 100 includes a movie image type classifying portion 54, which performs classification into movie image types, and a movie image type database 56, which stores information for the movie image type classifying portion 54 to perform classification into movie image types. Specifically, the movie image type database 56 stores learning parameters to be used in a machine learning method for performing classification into movie image types. Note that the movie image types obtained by classification performed by the movie image type classifying portion 54 match the movie image types in the type-correspondence rule table 500, which is stored in the type-correspondence rule database 48. In the present embodiment, the movie image type classifying portion 54 functions as a classifying portion that classifies a movie image into a preset movie image type.

Furthermore, the photobook creation apparatus 100 includes a priority calculating portion 58 that calculates a priority for preferentially displaying frames on the selection screen 600 for each movie image type. That is, the priority calculating portion 58 assigns a priority to each movie image type. In the present embodiment, the priority calculating portion 58 functions as an assigning portion that assigns a priority to a movie image type.
<Photobook Creation Processing>

With the above-described configurations, an explanation is given of photobook creation processing for creating a photobook by use of the photobook creation apparatus 100. Note that, in the following explanation, the same or corresponding processes as those of the photobook creation processing performed by the photobook creation apparatus 10 in the first embodiment are assigned with the same step numbers as those used in the first embodiment, so as to omit detailed explanations thereof.

Figure 11:
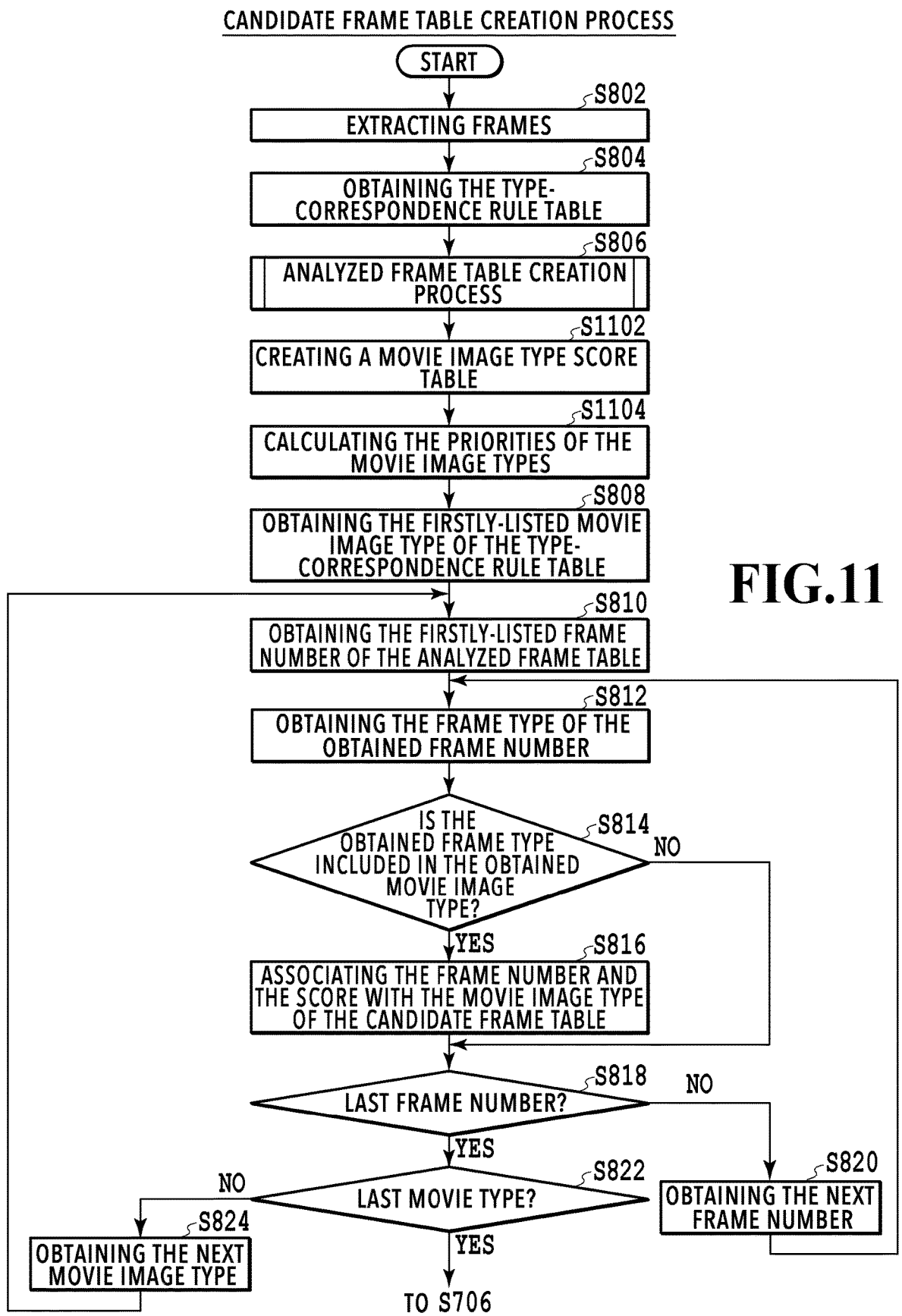
FIG. 11 is a flowchart of a candidate frame table creation process performed by the image processing apparatus according to the second embodiment.

FIG. 11 is a flowchart illustrating detailed processing contents of a candidate frame table creation process, which is a subroutine of the photobook creation processing performed by the photobook creation apparatus 100. Note that, upon an instruction for creating a photobook, the photobook creation apparatus 100 starts the photobook creation processing illustrated in FIG. 7. In S704 of this photobook creation processing, the candidate frame table creation process illustrated in FIG. 11 is performed on the movie image obtained in S702.

In the candidate frame table creation process of FIG. 11, after the analyzed frame table creation process in S806, the movie image type classifying portion 54 creates a movie image type score table 1200 in which classification of a movie image type is associated with a classification score indicating the certainty thereof (S1102). That is, in S1102, first, learning parameters are obtained from the movie image type database 56, and the input movie image is classified into a preset movie image type by use of the learning parameters. Specifically, for example, first, as for the obtained movie image, the ratios of the set frame types are calculated by use of the analyzed frame table 300. Thereafter, the calculated ratios of the respective frame types are used as feature amount spaces, so that classification into the movie image types are performed by use of learning results obtained by clustering in advance. Specifically, the feature amount spaces are classified into the closest ones of the movie image type clusters obtained by the learning. Next, a classification score indicating the certainty of the classified movie image type is obtained. Then, the movie image type score table 1200 is created by use of the classified movie image types and the classification scores. Note that publicly-known techniques can be used for obtaining a classification score (first score), and thus explanations thereof will be omitted.

FIG. 12 is a diagram illustrating an example of the movie image type score table 1200. The movie image type score table 1200 is configured with a movie image type and a classification score. As with the score (second score) corresponding to a frame type, the classification score is represented by a value between 0 and 1.0, and, the higher the value is, the higher the likelihood of the classified movie image type is, that is, it is indicated that the degree of certainty of the movie image type is high.

Note that, although the movie image type classifying portion 54 is configured to perform classification into movie image types by using the ratio of each frame type as a feature amount, the movie image type classifying portion 54 is not limited as such. That is, it is also possible that information obtained by analyzing frames, such as a rate of presence or absence of detection of an important person or color information, is used as a feature amount. Alternatively, it is also possible that information obtained at the time of image-capturing, such as the time of image-capturing, the recording time length, information related to a shift of the focal length for each frame, or the image-capturing mode and model name of the camera used for the image-capturing, is used as a feature amount. Further, it is also possible to use the above-described information in combination with each other.

After the movie image type score table 1200 is created in S1102, the priority calculating portion 58 then calculates priorities that indicate the display order of the movie image types, based on the movie image type score table 1200, for the type-correspondence rule table 500 obtained in S804 (S1104). That is, based on the classification scores in the movie image type score table 1200, priorities are assigned to the movie image types in the type-correspondence rule table 500, and the order of the movie image types in the type-correspondence rule table 500 is changed. In the case of the movie image type score table 1200 illustrated in FIG. 12, as for the type-correspondence rule table 500, TYPE A is positioned in the upper row, TYPE C is positioned in the middle row, and TYPE B is positioned in the lower row.

Thereafter, the processing proceeds to S808, so that the firstly-listed movie image type of the type-correspondence rule table 500, on which the priorities are reflected, is obtained. As the processing further proceeds, in a case when it is determined in S822 that the movie image type is not the last movie image type, the next movie image type of the type-correspondence rule table 500, on which the priorities are reflected, is obtained, and the processing returns to S810. In this candidate frame table creation process, in the case of the movie image type score table 1200 illustrated in FIG. 12, such a candidate frame table 1300 as illustrated in FIG. 13 is created. FIG. 13 is a diagram illustrating an example of the candidate frame table 1300. In the candidate frame table 1300, unlike the candidate frame table 400 in the first embodiment, the movie image types are arranged from the upper row in the descending order of the classification scores. That is, in the candidate frame table 1300, the display positions of TYPE B and TYPE C are opposite, as compared to those of the candidate frame table 400.

As the processing proceeds, the firstly-listed movie image type of the candidate frame table 1300 is obtained in S706, and the frame number of this movie image type is obtained in S708, then the frame corresponding to this frame number is displayed on the selection screen 600 in S710. Then, in a case when it is determined in S712 that the movie image type is not the last movie image type, the next movie image type of the candidate frame table 1300 is obtained in S714, and the processing returns to S708. Therefore, after the frames of TYPE A are displayed on the selection screen 600, a frame whose movie image type is TYPE C is obtained in S714. As a result, on the selection screen 600, the frames sorted into TYPE A are displayed in the upper row, the frames sorted into TYPE C are displayed in the middle row, and the frame types sorted into TYPE B are displayed in the lower row.

As explained above, the photobook creation apparatus 100, which is the image processing apparatus according to the second embodiment, classifies frames that are candidates for significant moments, which are extracted from a movie image, into preset frame types. Next, classification into movie image types is performed for the movie image from which the frames are extracted, and classification scores indicating certainty of the movie image types are obtained, so that, based on the classification scores, priorities are assigned to the movie image types of the type-correspondence rule table 500. Thereafter, based on the type-correspondence rule table 500 on which the display order has been changed according to the priorities, frames whose score representing the certainty of the frame type exceeds a predetermined value are sorted into the respective movie image types. Then, on the selection screen 600, the frames are displayed in a descending order based on the priorities of the movie image types.

Accordingly, since frames that are classified into movie image types with higher degrees of certainty are displayed in an upper row of the selection screen 600, it is possible for the user to easily and more accurately select a desired frame.

Third Embodiment

Next, with reference to FIG. 14 through FIGS. 23A and 23B, an explanation is given of the image processing apparatus according to the third embodiment. Note that, in the following explanation, the same or corresponding configurations as those of the first embodiment and the second embodiment described above are assigned with the same signs as those used in the respective embodiments, so as to omit detailed explanations thereof.

The third embodiment is different from the image processing apparatus according to the second embodiment described above in the following aspects. That is, in the third embodiment, learning parameters for classification of preset frame types, learning parameters for classification of movie image types, and the type-correspondence rule table 500 for sorting frames into movie image types, based on the frame types, are created. That is, if assuming that the photobook creation processing explained in the second embodiment is the main processing, an update process for preparing and updating learning parameters and the type-correspondence rule table 500 is added in the present embodiment as a preprocessing to be performed prior to the main processing.

<Functional Configuration>

Figure 14:
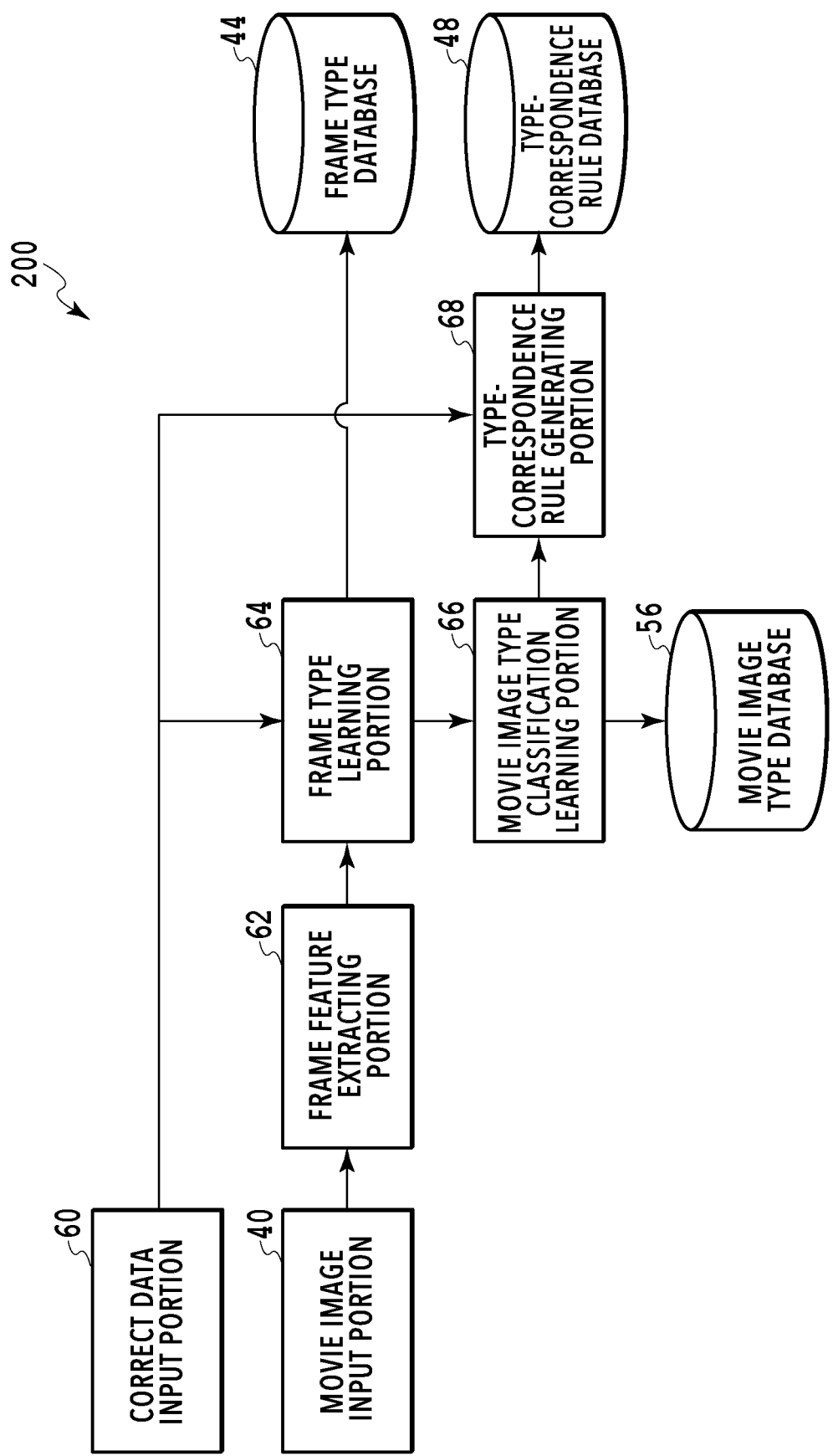
FIG. 14 is a block diagram illustrating a functional configuration of the image processing apparatus according to the third embodiment.

FIG. 14 is a diagram illustrating a functional configuration for generating learning parameters and the type-correspondence rule table 500 for the photobook creation apparatus 200 according to the third embodiment. Note that, since the functional configuration of the photobook creation apparatus 200 for creating a photobook is the same as that of the photobook creation apparatus 100, the explanation thereof will be omitted.

In addition to each configuration of the photobook creation apparatus 100, the photobook creation apparatus 200 includes a correct data input portion 60 that inputs the later-described correct data table 1500 to the later-described frame type learning portion 64 and type-correspondence rule generating portion 68. Furthermore, the photobook creation apparatus 200 includes a frame feature extracting portion 62, which extracts a feature amount from a frame, and a frame type learning portion 64, which obtains a learning parameter for classification of frame types. Moreover, the photobook creation apparatus 200 includes a movie image type classification learning portion 66, which obtains a learning parameter for classification of movie image types, and the type-correspondence rule generating portion 68, which generates the type-correspondence rule table 500.

More specifically, the correct data input portion 60 inputs the correct data table 1500, which clarifies the correspondence of a file name that represents the name of a movie image file for a scene, a frame number, and a frame type, to the frame type learning portion 64 and the type-correspondence rule generating portion 68. FIG. 15 is a diagram illustrating an example of the correct data table 1500. The correct data table 1500 is configured with a file name, a frame number, and a frame type, so as to indicate the frame number and the frame type that the user desires to output as a significant moment from each movie image file (hereafter also simply referred to as a "file").

The frame feature extracting portion 62 extracts a feature amount of a frame extracted from the input movie image. Furthermore, a frame feature table 1600, which is a table for managing the extracted feature amounts, is created. FIG. 16 is a diagram illustrating an example of the frame feature table 1600. The frame feature table 1600 is configured with a file name, a frame number, and a frame feature amount list, and includes a list of feature amounts calculated for each frame. As with the feature amount obtained by the frame analyzing portion 42, the feature amount may be information obtained at the time of image-capturing, such as the focal length and the time of image-capturing, luminance information, and color information, which are obtained as a result of analysis of a frame. The feature amount is represented by a value normalized between 0 and 1.0.

By use of the frame feature table 1600 and the correct data table 1500, the frame type learning portion 64 learns the frame types and outputs the learning parameters thereof to the frame type database 44. In the present embodiment, the frame type learning portion 64 functions as a first learning portion that learns a frame type so as to obtain a first learning parameter for classifying the frame type.

By use of a learning result of a frame type, which is obtained by the frame type learning portion 64, the movie image type classification learning portion 66 learns classification of a movie image type and outputs the learning parameters thereof to the movie image type database 56. In the present embodiment, the movie image type classification learning portion 66 functions as a second learning portion that learns classification of a movie image type so as to obtain a second learning parameter for classifying the movie image type.

By use of information of the movie image types classified by the movie image type classification learning portion 66 and the correct data table 1500, the type-correspondence rule generating portion 68 generates the type-correspondence rule table 500 and outputs the type-correspondence rule table 500 to the type-correspondence rule database 48. In the present embodiment, the type-correspondence rule generating portion 68 functions as a creating portion that creates the type-correspondence rule table 500.

(Update Process)

With the above-described configurations, the photobook creation apparatus 200 performs photobook creation processing for creating a photobook. Noted that, in the photobook creation apparatus 200, an update process for updating a learning parameter, etc., to be used in the photobook creation processing is executed at a predetermined timing, such as before the photobook creation processing is executed or when a movie image is input. The photobook creation processing performed by the photobook creation apparatus 200 is the same processing as that of the photobook creation apparatus 100 described above. Therefore, in the following explanation, a detailed description of the photobook creation processing will be omitted, and the update process executed at a predetermined timing will be described in detail.

Figure 17:
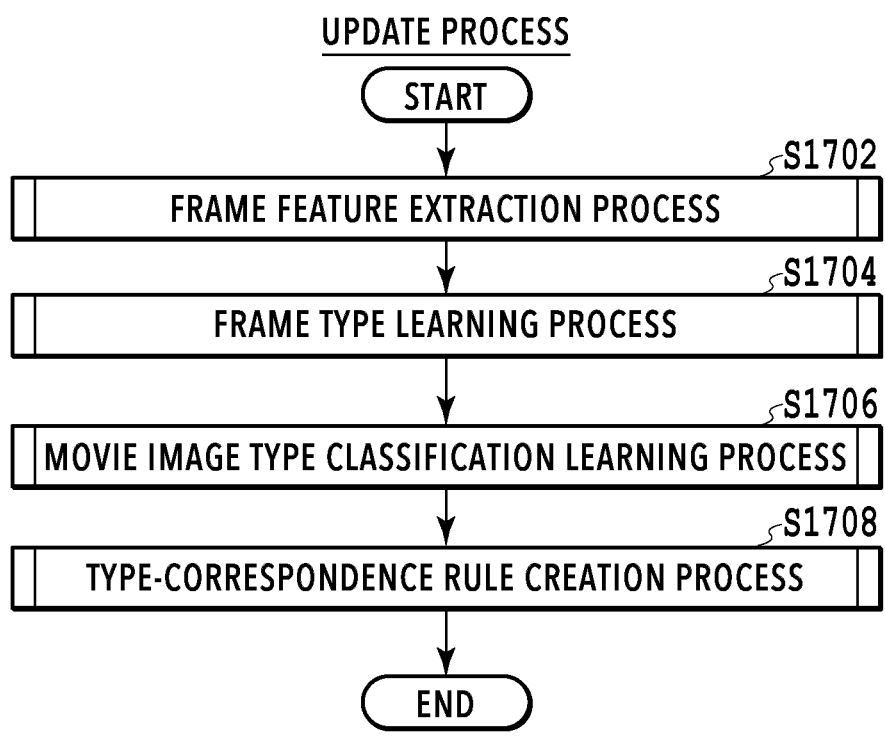
FIG. 17 is a flowchart of an update process.

FIG. 17 is a flowchart illustrating the details of the update process. When the update process is started, first, the frame feature extracting portion 62 executes a frame feature extraction process for extracting the feature amount of each frame in the input movie image (S1702). Next, the frame type learning portion 64 executes a frame type learning process for updating learning parameters to be used for classification of frame types (S1704). Then, the movie image type classification learning portion 66 executes a movie image type classification learning process for updating learning parameters to be used for classification of movie image types (S1706). Thereafter, the type-correspondence rule generating portion 68 executes a type-correspondence rule creation process for updating the type-correspondence rule table 500 (S1708), and the update process ends. Hereafter, a detailed explanation is given of each process.

<Frame Feature Extraction Process>

Figure 18:
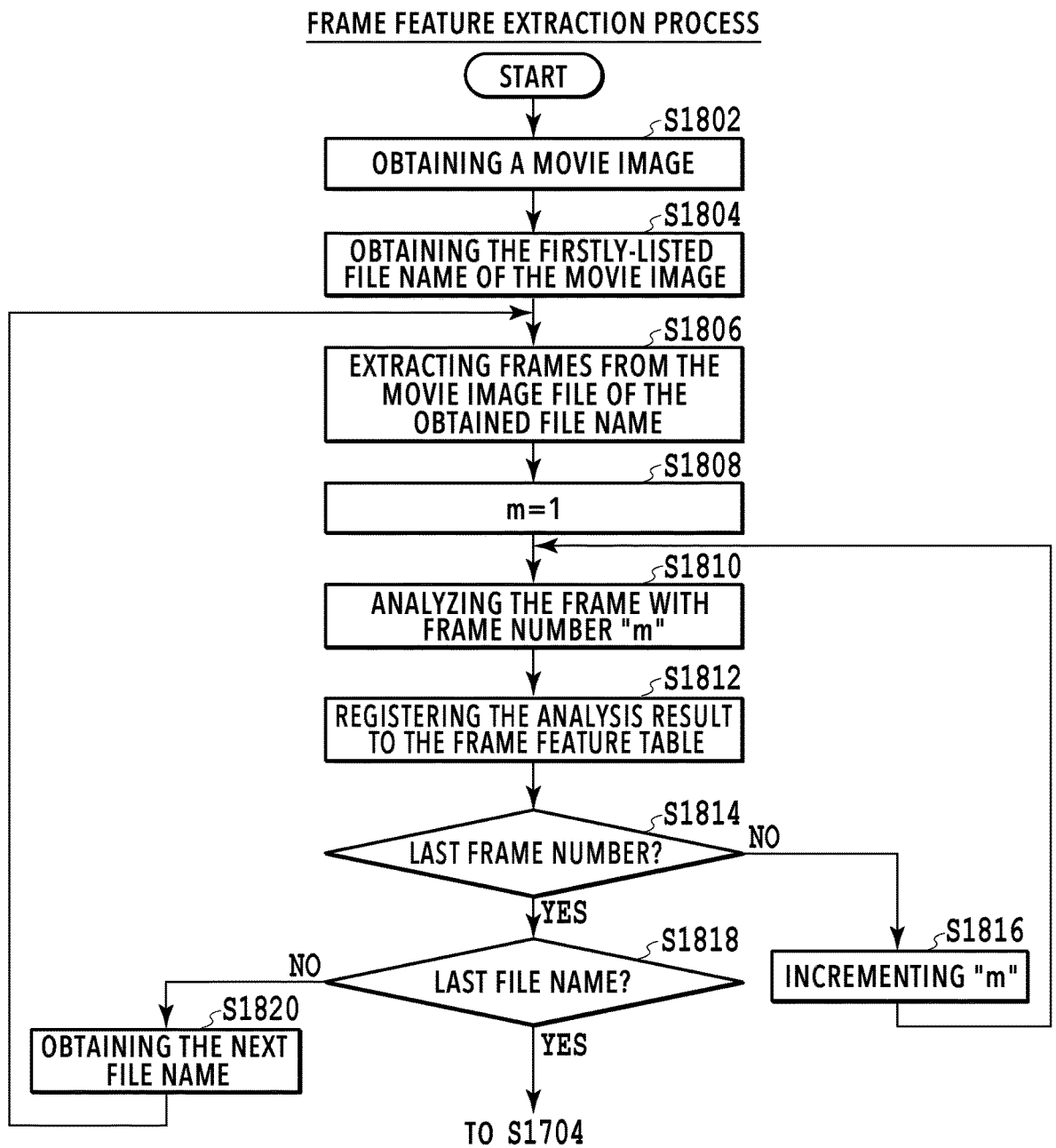
FIG. 18 is a flowchart of a frame feature extraction process.

FIG. 18 is a flowchart illustrating a detailed processing routine of the frame feature extraction process. In the frame feature extraction process of S1702, first, the movie image output from the movie image input portion 40 is obtained (S1802). Next, the firstly-listed file name of the movie image is obtained (S1804). That is, in S1804, in a case when a file name is assigned to each captured movie image file, the assigned file name that is listed first is obtained. Furthermore, in a case when file names are not assigned, the obtained movie image is divided by use of a publicly-known technique such as scene division, and a different file name is assigned to each of the divided movie image files. Then, out of the assigned file names, the firstly-listed file name is obtained. Note that the file names only need to be identifiable and, therefore, may have a form such as an ID in terms of expression.

Thereafter, frames are extracted from the movie image file of the obtained file name (S1806). In S1806, the extracted frames are assigned with frame numbers that are serial numbers. Then, variable "m" which represents the processing-target frame number is set to "1" (S1808). That is, in S1808, the frame number that is assigned to the firstly-listed frame is set.

Next, the frame with frame number "m" is obtained and analyzed (S1810). In S1810, the frame is analyzed and the feature amount of the frame is calculated. Then, the analysis result, that is, the feature amount is associated with the file name and the frame number and registered in the frame feature table 1600 (S1812). Note that, in the frame feature table 1600, the feature amount is displayed as a frame feature amount list, which is a list of multiple pieces of information, for example.

Thereafter, whether or not processing-target frame number "m" is the last frame number of the movie image file is determined (S1814). In a case when it is determined in S1814 that frame number "m" is not the last frame number, variable "m" is incremented (S1816) and the processing returns to S1810. Further, in a case when it is determined in S1814 that frame number "m" is the last frame number, whether or not the processing-target file name is the last file name in the obtained movie image is determined (S1818). In a case when it is determined in S1818 that the file name is not the last file name, the next file name in the obtained movie image is obtained (S1820), and the processing returns to S1806. Furthermore, in a case when it is determined in S1816 that the file name is the last file name, the processing proceeds to the frame type learning process of S1704.

<Frame Type Learning Process>

Figure 19:
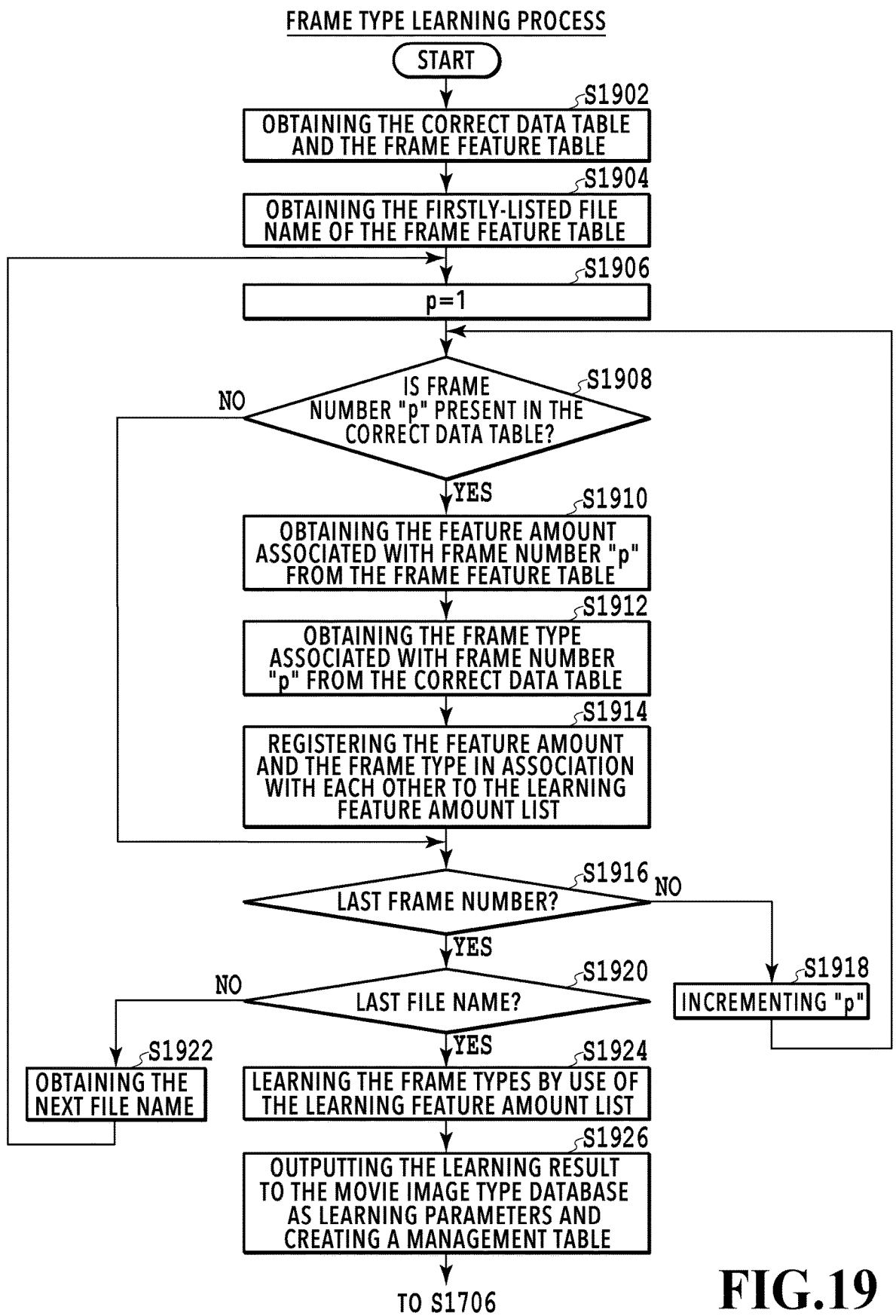
FIG. 19 is a flowchart of a frame type learning process.

FIG. 19 is a flowchart illustrating a detailed processing routine of the frame type learning process. In the frame type learning process of S1704, first, the correct data table 1500, which is input from the correct data input portion 60, and the frame feature table 1600, which is created in the frame feature extraction process of S1702, are obtained (S1902). Then, the firstly-listed file name of the frame feature table 1600 is obtained (S1904). That is, in the case of the frame feature table 1600 of FIG. 16, the frame name "MVI_0001.mp4" is obtained.

Next, variable "p" that represents the processing-target frame number is set to "1" (S1906), and whether or not frame number "p" corresponding to the obtained file name is present in the correct data table 1500 is determined (S1908). In a case when it is determined that frame number "p" is not present in the correct data table 1500, the processing proceeds to S1916, which is described later. On the other hand, in a case when it is determined that frame number "p" is present in the correct data table 1500, the feature amount associated with frame number "p" of the obtained file name is obtained from the frame feature table 1600 (S1910). That is, in S1910, all the information registered in the frame feature list in association with frame number "p" is obtained. Furthermore, the frame type associated with frame number "p" of the obtained file name is obtained from the correct data table 1500 (S1912).

Thereafter, the feature amount obtained in S1910 and the frame type obtained in S1912 are associated with each other and registered in the learning feature amount list 2200 (S1914). FIG. 22A is a diagram illustrating an example of the learning feature amount list 2200. The learning feature amount list 2200 is a table for learning frame types and is configured with frame types obtained from the correct data table 1500 and frame feature amount lists obtained from the frame feature table 1600.

After the registration to the learning feature amount list 2200 is completed, whether or not processing-target frame number "p" is the last frame number of the obtained file name is determined (S1916). In a case when it is determined in S1916 that frame number "p" is not the last frame number of the obtained file name, variable "p" is incremented (S1918) and the processing returns to S1908. Further, in a case when it is determined in S1916 that frame number "p" is the last frame number of the obtained file name, whether or not the processing-target file name is the last file name of the frame feature table 1600 is determined (S1920). In a case when it is determined in S1920 that the file name is not the last file name, the next file name in the frame feature table 1600 is obtained (S1922), and the processing returns to S1906. On the other hand, in a case when it is determined in S1920 that the file name is the last file name, learning of frame types is performed by use of the learning feature amount list 2200 (S1924). Then, the learning result is output to the movie image type database 56 and a management table 2202 for managing the learning result is created (S1926), and the processing proceeds to the movie image type classification learning process of S1706. Note that the learning result to be output to the movie image type database 56 is learning parameters in which feature amounts and frame types are associated with each other for classification of frame types. Furthermore, in the management table 2202, frame types obtained in learning are associated with the file names and the frame numbers, which are identification information of the frames.

Although the learning method in S1924 can be executed by use of various kinds of publicly-known techniques, it is preferable that the same algorithm as the frame type classification process executed by the frame analyzing portion 42 is used. For example, in a case when the frame analyzing portion 42 uses a support vector machine method, which is used in general object detection techniques, as the frame type classification process, the frame type learning portion 64 uses the support vector machine method for the frame type learning process. Note that, in a case when the frame type classification process and the frame type learning process are different, one algorithm is converted to the other algorithm. Further, in a case when a general object detection technique is used, a detection region may be added as an item of the correct data table 1500. In this case, the region corresponding to a frame type is designated, and, in the item of the detection region, the coordinate information of the region is registered.

FIG. 22B is a diagram illustrating an example of the management table 2202. The management table 2202 is a table in which identification information of a frame is associated with a frame type obtained by the learning conducted by the frame type learning portion 64, and the management table 2202 is configured with a file name, a frame number, and a frame type. The file names correspond to the file names in the correct data table 1500. As the frame numbers, the frame numbers corresponding to the number of frames that is set are obtained. The number of frames may be set by the user. Furthermore, by not using consecutive frame numbers, it is possible to improve the processing speed and to prevent learning errors from occurring. The frame types are obtained as a result of the learning conducted by the frame type learning portion 64, and the information of the frame types in the correct data table 1500 is not to be used. Therefore, the management table 2202 may include a frame type that is erroneously determined.

<Movie Image Type Classification Learning Process>

Figure 20:
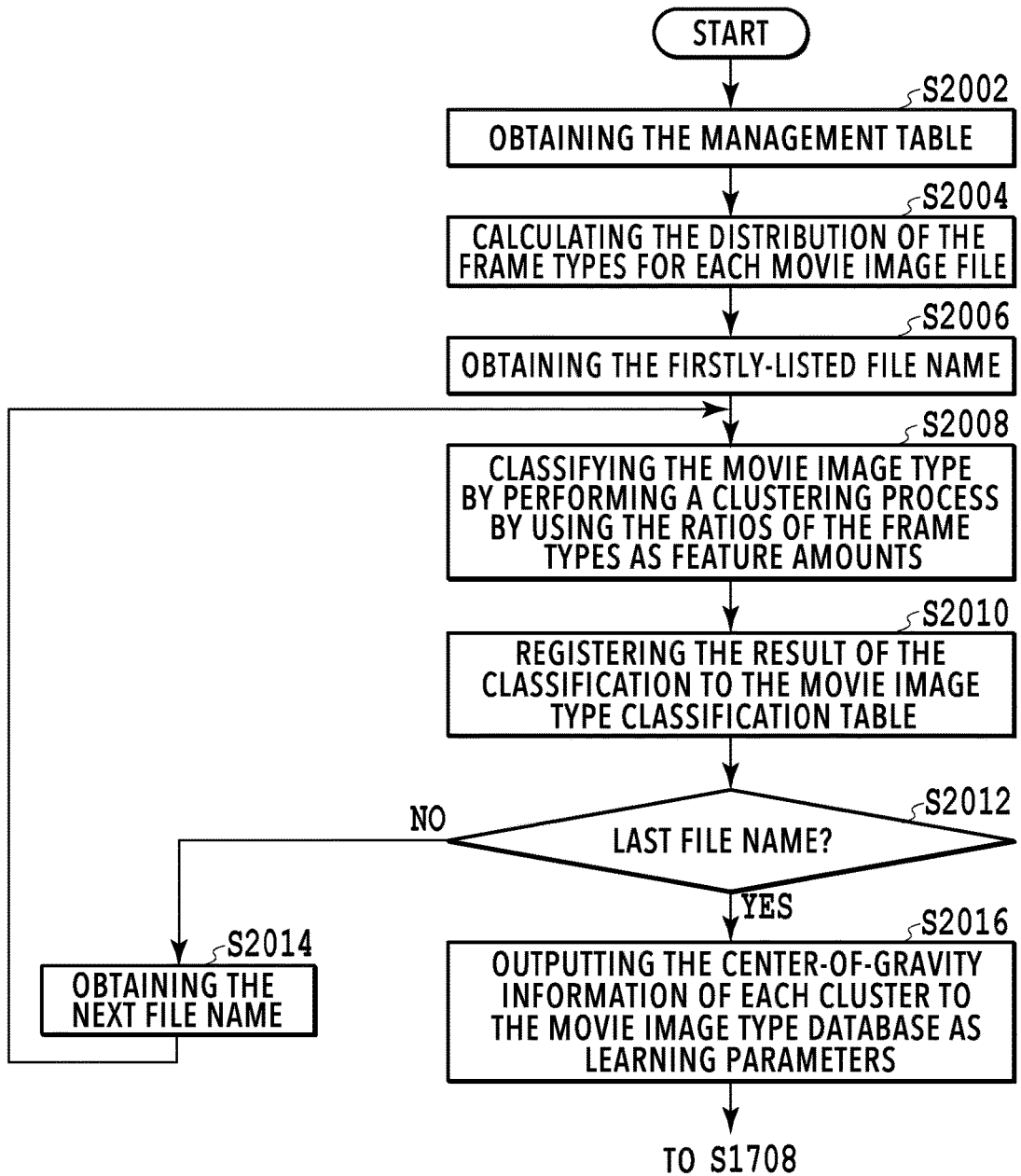
FIG. 20 is a flowchart of a movie image type classification learning process.

FIG. 20 is a flowchart illustrating a detailed processing routine of the movie image type classification learning process. In the movie image type classification learning process of S1706, first, the management table 2202 created by the frame type learning portion 64 is obtained (S2002). Next, the frame types learned for each movie image file are obtained from the management table 2202, and the distribution of the frame types for each movie image file is calculated (S2004). That is, in S2004, for each movie image file, the ratio of each frame type to the entire number of frame types is calculated, so as to create a distribution table 2300, which represents the distribution of the frame types. FIG. 23A is a diagram illustrating an example of the distribution table 2300. For example, in the management table 2202 of FIG. 22B, movie image file "MVI_0002.mp4" includes three "KICKING BALL" frame types, one "CATCHING BALL" frame type, and one "WHALE JUMPING" frame type. Therefore, in the distribution table, the numerical value representing the distribution of "KICKING BALL" of file name "MVI_0002.mp4" is "0.6", which is ⅗. Note that FIG. 23A is an example of the distribution table 2300 and is not associated with the management table 2202 of FIG. 22B.

Thereafter, the firstly-listed file name of the distribution table 2300 is obtained (S2006), then a clustering process is performed with a feature amount space by using the calculated ratios of the frame types as feature amounts, so as to perform classification of the movie image type (S2008). That is, in S2006, file name "MVI_0002.mp4" is obtained. Publicly-known techniques can be applied to the clustering process, and, for example, in a case when the number of movie image types is known in advance, the number of clusters K can be set to the number of movie image types, so as to perform the clustering process by use of the K-means method. Alternatively, a method such as the X-means method for automatically estimating the number of clusters may be used.

Next, the result of classifying the movie image type is registered in the movie image type classification table 2302 (S2010). That is, in the movie image type classification table 2302, in association with a movie image type, the file names classified into the movie image type are registered as frame identification information. FIG. 23B is a diagram illustrating an example of the movie image type classification table 2302. The movie image type classification table 2302 is a table in which frame identification information is associated with a movie image type obtained by the learning conducted by the movie image type classification learning portion 66, and the movie image type classification table 2302 is configured with a movie image type and a movie image file list. The movie image type classification table 2302 stores a list of movie image files clustered for each movie image type.

Then, whether or not the processing-target movie image file corresponds to the last file name in the distribution table 2300 is determined (S2012), and, in a case when it is determined that the processing-target movie image file does not correspond to the last file name, the next file name in the distribution table 2300 is obtained (S2014), and the processing returns to S2008. On the other hand, in a case when it is determined in S2012 that the processing-target movie image file corresponds to the last file, the center-of-gravity information of each cluster, which is obtained by performing clustering, is output to the movie image type database 56 as learning parameters to be used for classification of movie image types (S2016). Thereafter, the processing proceeds to the type-correspondence rule creation process of S1708.

<Type-Correspondence Rule Creation Process>

Figure 21A:
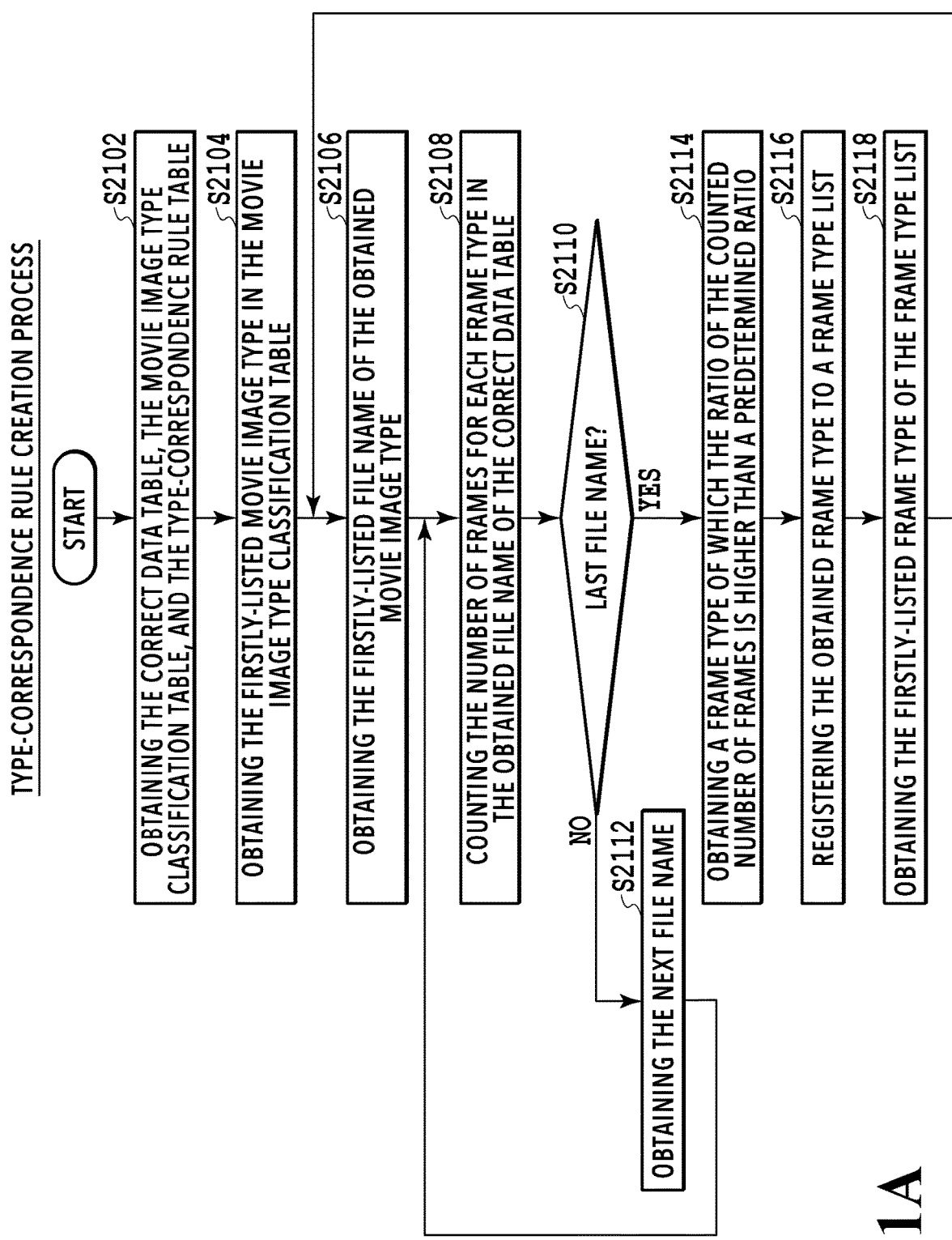
FIGS. 21A and 21B are flowcharts of a type-correspondence rule creation process.
Figure 21B:
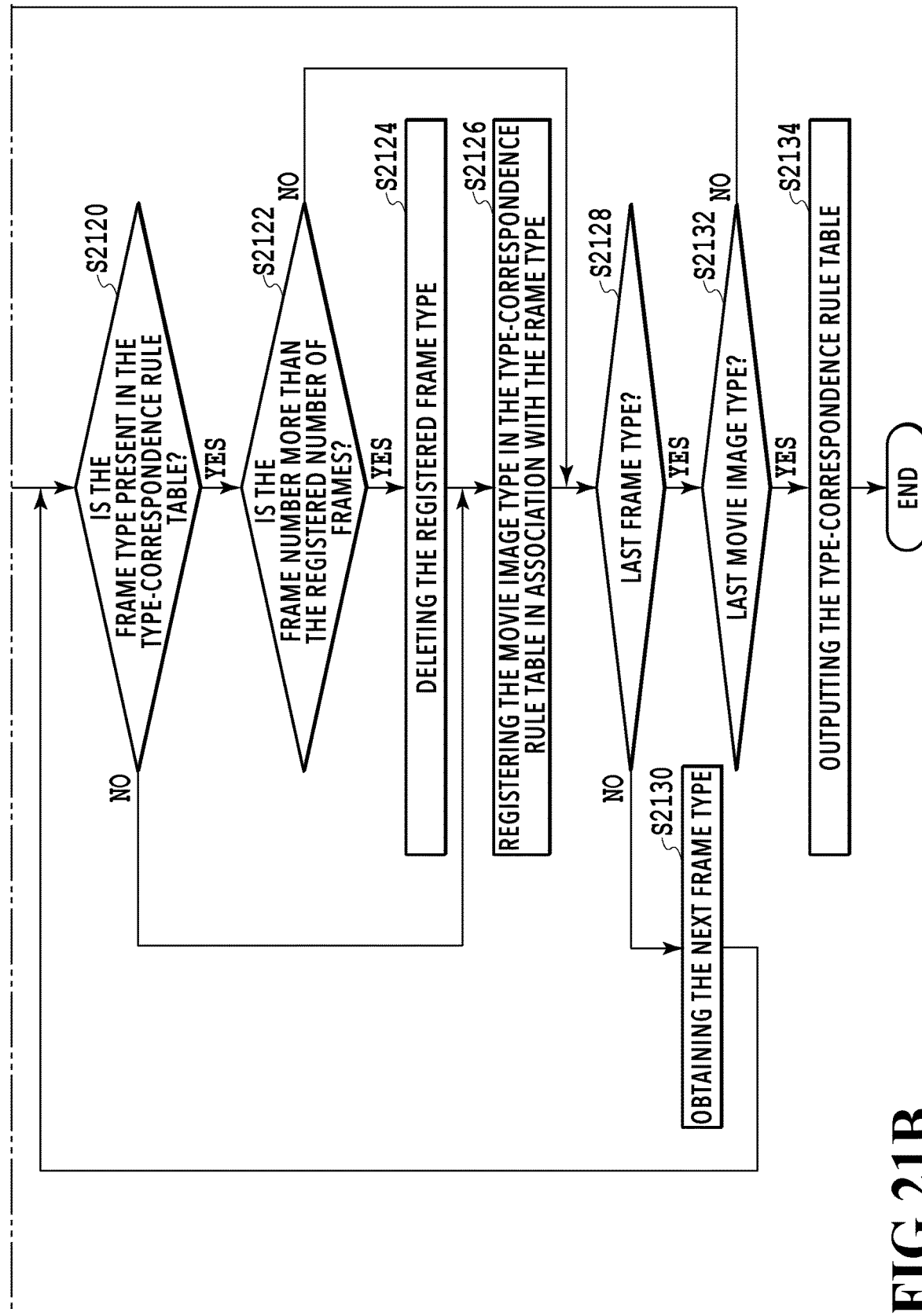

FIGS. 21A and 21B are flowcharts illustrating a detailed processing routine of the type-correspondence rule creation process. In the type-correspondence rule creation process of S1708, first, the correct data table 1500, the movie image type classification table 2302, and the type-correspondence rule table 500 are obtained (S2102). Next, the firstly-listed movie image type in the movie image type classification table 2302 is obtained (S2104), and the firstly-listed file name of the movie image file list associated with the obtained movie image type is obtained (S2106). That is, in the case of the movie image type classification table 2302 of FIG. 23B, "TYPE A" is obtained as the movie image type in S2104, and the file name "MVI_0002.mp4" is obtained in S2106.

Then, in the correct data table 1500, the number of frames is counted for each frame type in the obtained file name (S2108). That is, in a case when the file name obtained in S2106 is "MVI_0002.mp4", the numbers of frames of the frame types "KICKING BALL" and "CATCHING BALL" in the correct data table 1500 are counted. In this case, "KICKING BALL" is "3" and "CATCHING BALL" is "1". Furthermore, in a case when the frame type "KICKING BALL" in a predetermined movie image file is "2", "2" is added to the count number of "KICKING BALL" counted so far.

Next, whether or not the processing-target file name is the last file name in the movie image file list is determined (S2110), and, in a case when it is determined that the processing-target file name is not the last file name, the next file name in the movie image file list is obtained (S2112), and the processing returns to S2108. On the other hand, in a case when it is determined in S2110 that the processing-target file name is the last file name, a frame type of which the ratio of the number of frames, which is counted for each frame type, to the total number of frames is higher than a predetermined ratio is obtained (S2114). Note that the total number of frames is the total sum of the numbers of frames counted for each frame type in a movie image file. As described above, in S2106 to S2114, the frame types whose ratio is higher than the predetermined ratio are obtained in each movie image type. Then, the obtained frame types are registered in a frame type list (not illustrated in the drawings) of frame types whose number of frames is higher by a predetermined ratio (S2116). In this frame type list, the frame types and the number thereof are managed.

Next, the firstly-listed frame type in the frame type list is obtained (S2118). Then, whether or not the obtained frame type is present in the type-correspondence rule table 500 is determined (S2120). That is, in S2120, whether or not the obtained frame type is associated with the movie image type corresponding to the processing-target movie image type in the type-correspondence rule table 500 is determined.

In a case when it is determined in S2120 that the obtained frame type is not present in the type-correspondence rule table 500, the processing proceeds to S2126, which is described later. On the other hand, in a case when it is determined in S2120 that the obtained frame type is present in the type-correspondence rule table 500, whether or not the number of frames is more than the registered number of frames is determined (S2122). That is, in S2122, whether or not the number of frames in the obtained frame type is more than the number of frames of the corresponding frame type, which is registered in the type-correspondence rule table 500, is determined. Note that, in the present embodiment, although not illustrated in the drawings, the number of frames is registered in the type-correspondence rule table 500 in association with a frame type.

In a case when it is determined in S2122 that the number of frames is less than the number of frames registered in the type-correspondence rule table 500, the processing proceeds to S2128, which is described later. On the other hand, in a case when it is determined in S2122 that the number of frames is more than the number of frames registered in the type-correspondence rule table 500, the corresponding frame type in the type-correspondence rule table 500 is deleted (S2124). Then, the processing proceeds to S2126, so that the movie image type corresponding to the processing-target movie image type is additionally registered in the type-correspondence rule table in association with the frame type and the number of frames.

Thereafter, the processing proceeds to S2128, so that whether or not the processing-target frame type is the last frame type is determined, and, in a case when it is determined that the processing-target frame type is not the last frame type, the next frame type in the frame type list is obtained (S2130), then the processing returns to S2120. On the other hand, in a case when it is determined in S2128 that the processing-target frame type is the last frame type, whether or not the processing-target movie image type is the last movie image type is determined (S2132), and, in a case when it is determined that the processing-target movie image type is not the last movie image type, the processing proceeds to S2106. On the other hand, in a case when it is determined that the processing-target movie image type is the last movie image type, the type-correspondence rule table 500 is output to the type-correspondence rule database 48, so that the type-correspondence rule table 500 of the type-correspondence rule database 48 is updated (S2134). Then, by ending the type-correspondence rule creation process, the update process is ended.

As explained above, in the photobook creation apparatus 200, the frame feature extracting portion 62 creates the frame feature table 1600 in which a frame feature amount is associated with each frame of each file of the input movie image. Furthermore, the frame type learning portion 64 learns frame types, based on the correct data table 1500 and the frame feature table 1600. Then, this learning result is output to the frame type database 44 as learning parameters for classification of frame types.

The movie image type classification learning portion 66 classifies movie image types by performing a clustering process using the ratios of frame types as feature amounts, based on the management table 2202 (first information) in which a frame type obtained in learning by the frame type learning portion 64 is associated with frame identification information. The center-of-gravity information of each cluster herein is output to the movie image type database 56 as learning parameters to be used for classification of movie image types. Furthermore, the type-correspondence rule table 500 is created, based on the correct data table 1500 and the movie image type classification table 2302 (second information) in which a movie image type obtained in learning by the movie image type classification learning portion 66 is associated with frame identification information.

Accordingly, by providing one kind of correct data, it is possible for the photobook creation apparatus 200 to learn frame types, to learn classification of movie image types, and to create the type-correspondence rule table 500.

Other Embodiments

Note that the above-described embodiments may be modified as shown in the following (1) through (7).

(1) Although not particularly described in the above embodiments, the photobook creation apparatus 10 executes the photobook creation processing for a predetermined movie image in a case when the predetermined movie image is input. Alternatively, it is also possible to execute the photobook creation processing for another movie image in parallel with the photobook creation processing for the predetermined movie image. Specifically, for example, while displaying frames on the selection screen 600 and allowing the user to select frames, the photobook creation processing for the next movie image can be executed.

(2) Although the priorities of the classified movie image types are determined based on the classification scores in the second embodiment described above, the present embodiment is not limited as such. That is, it is also possible to determine the priorities, based on the number of frames included in each movie image type of the candidate frame table 1300. In this case, the more the number of frames belonging to a movie image type registered in the candidate frame table 1300, the higher the degree of certainty of the movie image type may be. Therefore, even though the classification score of a movie image type is low, the priority thereof can be increased.

Alternatively, it is also possible to calculate the average value of the scores of the frame types classified into each movie image type of the candidate frame table 1300, so as to determine the priority, based on how high the average score is. In this case, the higher the calculated average score is, the higher the degree of certainty of the movie image type may be. Therefore, even in a case when the classification score of a movie image type is low and the number of frames included in the movie image type is low, the priority of the movie image type can be increased. Furthermore, it is also possible to obtain the maximum value among the scores of the frame types of the candidate frame table 1300, so as to adjust the priorities according to how high the obtained maximum value is. Specifically, the larger the maximum value is, the higher the priorities become.

Furthermore, it is also possible to calculate the priorities by combining items such as classification scores, the number of frames, the average value of the scores, and the maximum value of the scores, and it is also possible to weight each of such items. For example, in a case when the accuracy of classification of a movie image type is low, that is, in a case when the classification score is low, the weight of the number of frames or the average score of the frame type may be increased. Alternatively, in a case when the classification accuracy of a frame type is low, that is, in a case when the score is low, the weight of the classification score may be increased.

Figure 24:
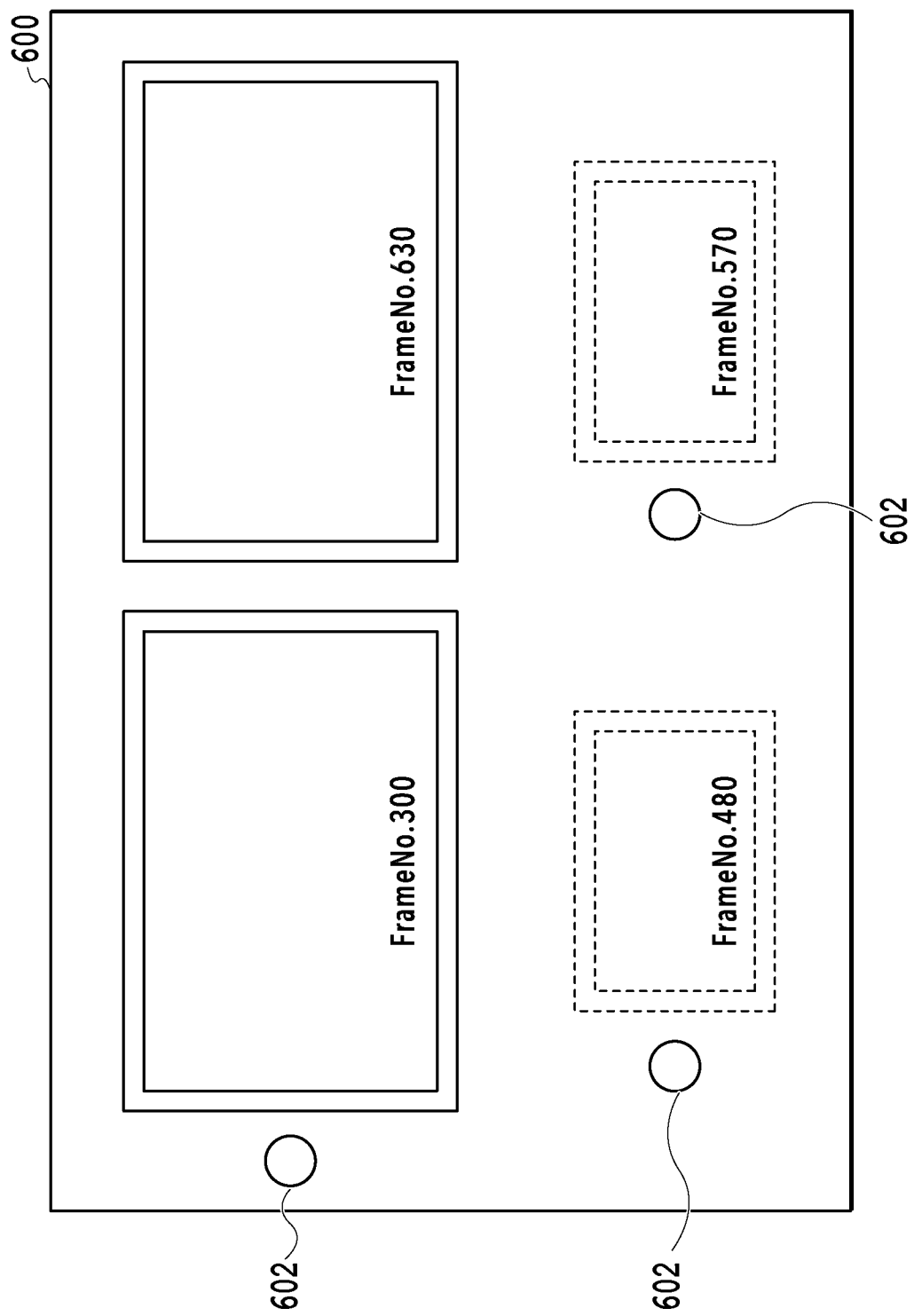
FIG. 24 is a diagram illustrating a modification example of the display form on the selection screen.

(3) Although not particularly described in the second embodiment, it is also possible to change the size or lightness of a frame displayed on the selection screen 600 according to the priority of the movie image type. For example, as illustrated in FIG. 24, the frames sorted into TYPE A, whose priority is high, are displayed larger than the frames sorted into TYPE B and TYPE C. Furthermore, here, it is also possible that the frames sorted into TYPE B and TYPE C are displayed with lower lightness than the frames sorted into TYPE A. Note that FIG. 24 is a diagram illustrating a modification example of the display form on the selection screen 600, and it is indicated that the frames shown by the broken line are being displayed with a lower lightness than the frames shown by the solid line. Furthermore, it is also possible that a frame having a low score, that is, a frame having a score that is equal to or lower than a predetermined value, is not displayed. Moreover, it is also possible that the frames are displayed in the order based on the scores, instead of the order based on the classification scores.

(4) Although not particularly described in the above embodiments, in a case when the recording time is long, such as in a case of an action camera or wearable camera, there is a possibility that the contents of the captured movie image are changed midway without ending the image-capturing. In this case, it is also possible to use a publicly-known technique such as scene division to divide the movie image file, so as to execute the photobook creation processing on a divided movie image. Furthermore, although the photobook creation apparatus 10 is provided with a display device such as the display 26 in the above-described embodiment, the present embodiment is not limited as such. That is, it is not necessary that the photobook creation apparatus 10 includes a display device, and, in that case, the display device is configured to be connectable as an external device.

(5) Although, in the third embodiment described above, the configuration for creating a photobook corresponds to that of the second embodiment, the embodiment is not limited as such, and it is also possible that the configuration corresponds to that of the first embodiment. Furthermore, the technique for obtaining the type-correspondence rule table 500 and learning parameters to be used for classification of frame types and movie image types is not limited to those explained above in the third embodiment, and it is possible to apply various kinds of publicly-known techniques. Furthermore, although, in the third embodiment described above, the photobook creation apparatus 200 obtains learning parameters to be used for classification of frame types, learning parameters to be used for classification of movie image types, and the type-correspondence rule table 500, the present embodiment is not limited as such. That is, it is also possible that an external device that is connected to the photobook creation apparatus 10 or 100 is configured to obtain at least one of the above-described learning parameters and the type-correspondence rule table 500.

(6) Although not particularly described in the above embodiments, the present invention can take an embodiment as a system, an apparatus, a method, a program, a storage medium, or the like, for example. Specifically, the embodiments may be applied to a system configured with multiple devices, such as a host computer, an interface device, an image capturing device, and a web application, or may be applied to an apparatus composed of a single device.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

(7) The above-described embodiments and various forms shown in (1) through (6) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing method for extracting a frame from a moving image, the image processing method comprising:
a determining step of determining a type of the moving image;
an extracting step of extracting a frame from the moving image, based on a result of determination in the determining step and information indicating a plurality of predetermined types of frame features, the extracted frame having at least one of the plurality of predetermined types of frame features, wherein the plurality of predetermined types of frame features correspond to a plurality of image-capturing scenes;
a sorting step of sorting a plurality of frames, which include the frame extracted in the extracting step, into a plurality of frame groups according to the type of the moving image that is determined in the determining step; and
a display control step of displaying the frame extracted in the extracting step on a display device, wherein, in the display control step, the plurality of frame groups are displayed on the display device, based on a result of sorting in the sorting step.

2. The image processing method according to claim 1 further comprising a first obtaining step of obtaining identification information of each of a plurality of frames extracted in the extracting step,
wherein, in the display control step, the plurality of frames are displayed on the display device, based on the identification information obtained in the first obtaining step.

3. The image processing method according to claim 1 further comprising a selecting step of selecting a frame displayed in the display control step, based on an instruction from a user.

4. The image processing method according to claim 1, wherein, in the sorting step, priorities are set for the plurality of frame groups, based on the result of determination of the type of the moving image in the determining step, and
wherein, in the display control step, the plurality of frame groups are displayed on the display device, based on the set priorities.

5. The image processing method according to claim 4, wherein, in the display control step, a size for displaying a frame included in a frame group is changed, based on the priorities.

6. The image processing method according to claim 4, wherein, in the display control step, lightness for displaying a frame included in a frame group is changed, based on the priorities.

7. The image processing method according to claim 1, wherein the determining step includes a second obtaining step of obtaining, for the moving image, a score indicating certainty of the type of the moving image being a first type and a score indicating certainty of the type of the moving image being a second type, and
wherein, in the determining step, the type of the moving image is determined, based on the scores obtained in the second obtaining step.

8. The image processing method according to claim 1 further comprising a specifying step of specifying an image-capturing scene of a type of a first frame included in the moving image and an image-capturing scene of a type of a second frame included in the moving image, based on the information indicating the plurality of predetermined types of frame features,
> wherein, in the determining step, the type of the moving image is determined, based on the image-capturing scene of the first frame and the image-capturing scene of the second frame specified in the specifying step, and
> wherein, in the extracting step, the first frame is extracted, based on the type of the moving image determined in the determining step and the image-capturing scene of the first frame specified in the specifying step.

9. The image processing method according to claim 8, wherein, in the determining step, the type of the moving image is determined, based on the number of frames in which a first image-capturing scene is specified in the specifying step and the number of frames in which a second image-capturing scene is specified in the specifying step.

10. The image processing method according to claim 1, wherein, in the determining step, the type of the moving image is determined, based on information obtained by analyzing a frame of the moving image.

11. The image processing method according to claim 1, wherein, in the determining step, the type of the moving image is determined, based on a time of image-capturing or a recording time length of the moving image.

12. The image processing method according to claim 1, wherein, in the determining step, the type of the moving image is determined, based on a shift of a focal length of each frame captured in the moving image.

13. The image processing method according to claim 1, wherein, in the determining step, the type of the moving image is determined, based on an image-capturing mode or a model name of a camera used for capturing the moving image.

14. The image processing method according to claim 1, wherein, in the extracting step, a frame whose score of a feature amount of the plurality of predetermined types of frame features exceeds a predetermined value is extracted.

15. The image processing method according to claim 1, wherein, in the extracting step, a frame is extracted by use of a first learning parameter that indicates the plurality of predetermined types of frame features.

16. The image processing method according to claim 15 further comprising a first learning step of learning a frame type by use of correct data and a feature amount of a frame and obtaining the first learning parameter.

17. The image processing method according to claim 15, wherein, in the determining step, the type of the moving image is determined by use of a second learning parameter for determining the type of the moving image.

18. The image processing method according to claim 17 further comprising a second learning step of learning the type of the moving image by use of information in which the frame type that is obtained by learning of a frame type by use of correct data and a feature amount of a frame is associated with identification information of the frame, so as to obtain the second parameter.

19. An image processing apparatus for extracting a frame from a moving image, the image processing apparatus comprising:
> a determining unit configured to determine a type of the moving image;
> an extracting unit configured to extract a frame from the moving image, based on a result of determination by the determining unit and information indicating a plurality of predetermined types of frame features, the extracted frame having at least one of the plurality of predetermined types of frame features, wherein the plurality of predetermined types of frame features correspond to a plurality of image-capturing scenes;
> a sorting unit configured to sort a plurality of frames, which include the frame extracted by the extracting unit, into a plurality of frame groups according to the type of the moving image that is determined by the determining unit; and
> a display control unit configured to display the frame extracted by the extracting unit on a display device, wherein, in the display control unit, the plurality of frame groups are displayed on the display device, based on a result of sorting by the sorting unit.

20. A non-transitory computer readable storage medium storing a program for causing a computer to perform an image processing method for extracting a frame from a moving image, the image processing method comprising:
> a determining step of determining a type of the moving image;
> an extracting step of extracting a frame from the moving image, based on a result of determination in the determining step and information indicating a plurality of predetermined types of frame features, the extracted frame having at least one of the plurality of predetermined types of frame features, wherein the plurality of predetermined types of frame features correspond to a plurality of image-capturing scenes;
> a sorting step of sorting a plurality of frames, which include the frame extracted in the extracting step, into a plurality of frame groups according to the type of the moving image that is determined in the determining step; and
> a display control step of displaying the frame extracted in the extracting step on a display a display control step of displaying the frame extracted in the extracting step on a display device, wherein, in the display control step, the plurality of frame groups are displayed on the display device, based on a result of sorting in the sorting step.

* * * * *